(12) United States Patent
Shah et al.

(10) Patent No.: US 10,698,427 B2
(45) Date of Patent: Jun. 30, 2020

(54) SYSTEM AND METHOD FOR ASSESSING SAND FLOW RATE

(71) Applicant: GE Oil & Gas Pressure Control LP, Houston, TX (US)

(72) Inventors: Vimal V. Shah, Sugar Land, TX (US); Lily Jiang, Edmond, OK (US); Lembit Salasoo, Niskayuna, NY (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 0 days.

(21) Appl. No.: 16/109,226

(22) Filed: Aug. 22, 2018

(65) Prior Publication Data

US 2019/0033898 A1    Jan. 31, 2019

Related U.S. Application Data

(63) Continuation-in-part of application No. 15/339,561, filed on Oct. 31, 2016, now abandoned.
(Continued)

(51) Int. Cl.
*G05D 7/06* (2006.01)
*G01N 15/02* (2006.01)
(Continued)

(52) U.S. Cl.
CPC ....... *G05D 7/0676* (2013.01); *G01N 15/0272* (2013.01); *G01N 29/024* (2013.01);
(Continued)

(58) Field of Classification Search
CPC .. G05D 7/0676; G05D 7/0605; G01N 29/032; G01N 29/024; G01N 29/4454;
(Continued)

(56) References Cited

U.S. PATENT DOCUMENTS 3,841,144 A    10/1974    Baldwin
3,854,323 A    12/1974    Hearn et al.
(Continued)

FOREIGN PATENT DOCUMENTS

CA    1016645    8/1977
CA    2053598    4/1992
(Continued)

OTHER PUBLICATIONS

International Search Report and Written Opinion dated Oct. 26, 2018 in corresponding PCT Appln No. PCT/US2018/047554.
(Continued)

*Primary Examiner* — Yasser A Abdelaziez
(74) *Attorney, Agent, or Firm* — Hogan Lovells US LLP

(57) ABSTRACT

Embodiments of the present disclosure include a method including receiving first impact data. The method includes receiving second impact data. The method includes applying a first filter to both the first impact data and the second impact data. The method includes applying a second filter to both the first impact data and the second impact data. Filtering includes time and frequency based discriminating filter to isolate specific signatures that representatively indicate impact signatures generated by the sand on the interrogator. The method includes comparing the first impact data and the second impact data for corresponding signatures. The method includes identifying a corresponding signature in both the first impact data and the second impact data. The method includes determining the corresponding signature meets a threshold criterion. The method includes determining one or more particulate properties based at least in part on the corresponding peak.

11 Claims, 26 Drawing Sheets

Related U.S. Application Data

(60) Provisional application No. 62/548,479, filed on Aug. 22, 2017.

(51) Int. Cl.

| | | |
|---|---|---|
| *G01N 29/04* | (2006.01) | |
| *G01N 29/14* | (2006.01) | |
| *G01N 29/44* | (2006.01) | |
| *G01N 29/024* | (2006.01) | |
| *G01N 29/032* | (2006.01) | |
| *E21B 34/02* | (2006.01) | |
| *E21B 43/12* | (2006.01) | |
| *G01H 1/16* | (2006.01) | |
| *G01H 11/00* | (2006.01) | |
| *G05B 15/02* | (2006.01) | |
| *G01N 15/00* | (2006.01) | |
| *G01F 1/30* | (2006.01) | |
| *G01F 1/74* | (2006.01) | |
| *G01F 15/00* | (2006.01) | |

(52) U.S. Cl.
CPC ......... *G01N 29/032* (2013.01); *G01N 29/046* (2013.01); *G01N 29/14* (2013.01); *G01N 29/4427* (2013.01); *G01N 29/4454* (2013.01); *E21B 34/02* (2013.01); *E21B 43/12* (2013.01); *G01F 1/30* (2013.01); *G01F 1/74* (2013.01); *G01F 15/00* (2013.01); *G01H 1/16* (2013.01); *G01H 11/00* (2013.01); *G01N 15/02* (2013.01); *G01N 29/4436* (2013.01); *G01N 2015/0003* (2013.01); *G01N 2015/0053* (2013.01); *G01N 2015/0277* (2013.01); *G01N 2291/011* (2013.01); *G01N 2291/015* (2013.01); *G01N 2291/02408* (2013.01); *G01N 2291/02416* (2013.01); *G01N 2291/02836* (2013.01); *G05B 15/02* (2013.01)

(58) Field of Classification Search
CPC .. G01N 29/4427; G01N 29/14; G01N 29/046; G01N 15/0272; G01N 2291/011; G01N 15/02; G01N 15/00; G01N 2291/015; G01N 2015/0053; G01N 2015/0003; G01N 2291/02836; G01N 2291/02416; G01N 29/4436; G01N 2015/0277; G01F 15/00; G01F 1/74; G01F 1/30; G05B 15/02; G01H 11/00; G01H 1/16; E21B 34/02; E21B 43/12
See application file for complete search history.

(56) References Cited

U.S. PATENT DOCUMENTS

| | | | |
|---|---|---|---|
| 3,991,603 A * | 11/1976 | Wonn | G01N 29/02 73/24.04 |
| 4,131,815 A | 12/1978 | Boatright | |
| 4,214,484 A | 7/1980 | Abts | |
| 4,217,781 A | 8/1980 | Abts | |
| 4,237,720 A | 12/1980 | Abts | |
| 4,240,287 A | 12/1980 | Mast et al. | |
| 4,296,628 A | 10/1981 | Mast | |
| 4,315,428 A | 2/1982 | Stuivenwold et al. | |
| 4,381,674 A | 5/1983 | Abts | |
| 4,389,880 A | 6/1983 | Robinet | |
| 4,598,593 A | 7/1986 | Sheen et al. | |
| 4,856,347 A | 8/1989 | Johnson | |
| 5,033,858 A | 7/1991 | Twerdochlib et al. | |
| 5,113,941 A | 5/1992 | Donovan | |
| 5,250,807 A | 10/1993 | Sontvedt | |
| 5,644,244 A | 7/1997 | Marrelli et al. | |
| 5,681,986 A | 10/1997 | Merk et al. | |
| 6,192,740 B1 | 2/2001 | Thomas et al. | |
| 6,888,631 B2 | 5/2005 | Eriksson | |
| 7,028,538 B2 | 4/2006 | Gysling et al. | |
| 7,072,044 B2 | 7/2006 | Kringlebotn et al. | |
| 7,503,217 B2 | 3/2009 | Johansen | |
| 7,578,203 B2 | 8/2009 | Andersen et al. | |
| 7,653,488 B2 | 1/2010 | Mese et al. | |
| 7,659,828 B2 | 2/2010 | Wehrs et al. | |
| 7,878,047 B2 * | 2/2011 | Hemblade | G01N 29/222 73/61.75 |
| 8,364,421 B2 | 1/2013 | Chen et al. | |
| 8,534,114 B2 | 9/2013 | Ellson | |
| 8,576,386 B2 | 11/2013 | Jones et al. | |
| 8,615,370 B2 | 12/2013 | Ong | |
| 8,622,128 B2 | 1/2014 | Hegeman | |
| 8,812,236 B1 | 8/2014 | Freeman et al. | |
| 9,007,580 B2 | 4/2015 | Ronaes et al. | |
| 9,170,240 B2 | 10/2015 | Lin et al. | |
| 9,327,214 B2 | 5/2016 | Hemstock | |
| 2001/0037883 A1 | 11/2001 | Veneruso et al. | |
| 2005/0126777 A1 | 6/2005 | Rolovic et al. | |
| 2007/0069903 A1 | 3/2007 | Wehrs et al. | |
| 2007/0175280 A1 | 8/2007 | Johansen | |
| 2007/0189452 A1 | 8/2007 | Johnson et al. | |
| 2008/0154510 A1 | 6/2008 | Scott | |
| 2010/0268489 A1 | 10/2010 | Lie et al. | |
| 2011/0301882 A1 | 12/2011 | Andersen | |
| 2012/0055264 A1 | 3/2012 | Sinha | |
| 2012/0057432 A1 | 3/2012 | Hill | |
| 2012/0287431 A1 | 11/2012 | Matsiev et al. | |
| 2014/0080115 A1 * | 3/2014 | Reed | G01N 15/0618 435/3 |
| 2015/0006091 A1 * | 1/2015 | Schoonover | G01M 3/007 702/39 |
| 2017/0130574 A1 | 5/2017 | Nunes et al. | |
| 2017/0130706 A1 | 5/2017 | Plaza et al. | |
| 2018/0120865 A1 * | 5/2018 | Nuryaningsih | G01H 11/02 |

FOREIGN PATENT DOCUMENTS

| | | |
|---|---|---|
| CA | 2103259 | 2/2000 |
| CA | 2547521 | 6/2005 |
| CN | 1123407 | 5/1996 |
| CN | 1639560 | 7/2005 |
| CN | 1693659 | 11/2005 |
| CN | 101482522 | 7/2009 |
| CN | 101514625 | 8/2009 |
| CN | 101581220 | 11/2009 |
| CN | 201407035 Y | 2/2010 |
| CN | 201532350 U | 7/2010 |
| CN | 102608005 | 7/2012 |
| CN | 202393764 U | 8/2012 |
| CN | 102914481 | 2/2013 |
| CN | 202853994 U | 4/2013 |
| CN | 104316597 | 1/2015 |
| CN | 104777055 | 7/2015 |
| CN | 104990849 | 10/2015 |
| CN | 204855313 U | 12/2015 |
| DE | 2840358 | 3/1979 |
| DE | 3621514 | 1/1988 |
| EP | 0148690 | 7/1985 |
| EP | 0807820 | 11/1997 |
| FR | 2316594 | 1/1977 |
| KR | 20120063238 | 6/2012 |
| SG | 180134 | 5/2012 |
| WO | 88/02855 | 4/1988 |
| WO | 93/09405 | 5/1993 |
| WO | 99/50641 | 10/1999 |
| WO | 2008/067615 | 6/2008 |
| WO | 2012/139554 | 10/2012 |

OTHER PUBLICATIONS

Kluth, E.L.E., et al., "Integrated Subsea Production Surveillance: Sensors for Subsea Production Systems," Society of Underwater Technology, p. 8, Nov. 7-9, 1995, Aberdeen, UK.

(56) References Cited

OTHER PUBLICATIONS

Hou, R., et al., "Acoustic monitoring of pipeline flows: particulate slurries," Powder Technology, vol. 106, Issue 1-2, pp. 30-36, Nov. 22, 1999.
Daud, Farik Mohd, et al., "Successful Application of Ultrasound Technology to Detect Sand Producing Intervals in the Wellbore," International Petroleum Technology Conference, pp. 12, Nov. 15-17, 2011, Bangkok, Thailand.
Baldwin, Willett F., et al., "Manifold for Flow Monitoring Means," T939,012, United States Patent and Trademark Office, Oct. 7, 1975.
Clampon Ultrasonic Intelligent Sensors, DSP Particle Monitor, http://www.clampon.com/products/topside/particle-monitor/.
Clampon SandX Monitor, http://www.clampon.com/wp-content/uploads/2014/11/ClampOn_SandQ_Aug2014.pdf.
Emerson Roxar Sand Erosion Probe, https://www.emerson.com/en-sg/catalog/roxar-high-pressure-probes.
Cosasco Sand Probe Erosion Detection System, http://www.cosasco.com/documents/Cosasco%20%20Sacrificial%20Sand%20Erosion%20Probe.pdf.
Brown Corrosion Pulsar SandAlert, http://www.browncorrosion.com/images/SandAlert.pdf.
Ziebel Z-Line and Z-System, https://www.ziebel.com/applications-/sand-detection.
Regtran RMG 3340—(2 or 3), http://www.regtron.kfkipark.hu/diagmon.html.
Schlumberger SandCAT, Sand Advisor, http://www.slb.com/services/completions/sand_control.aspx.

\* cited by examiner

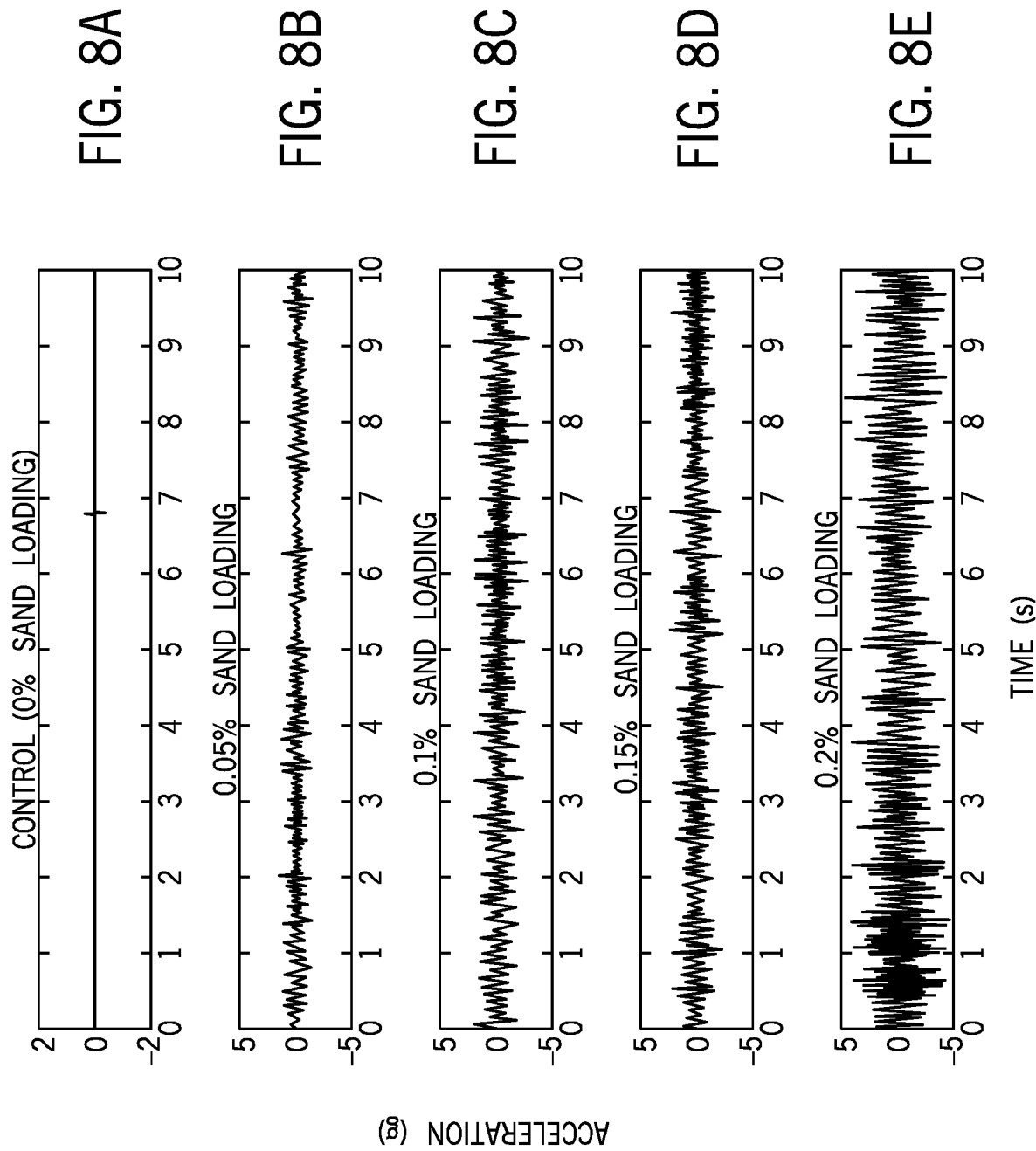

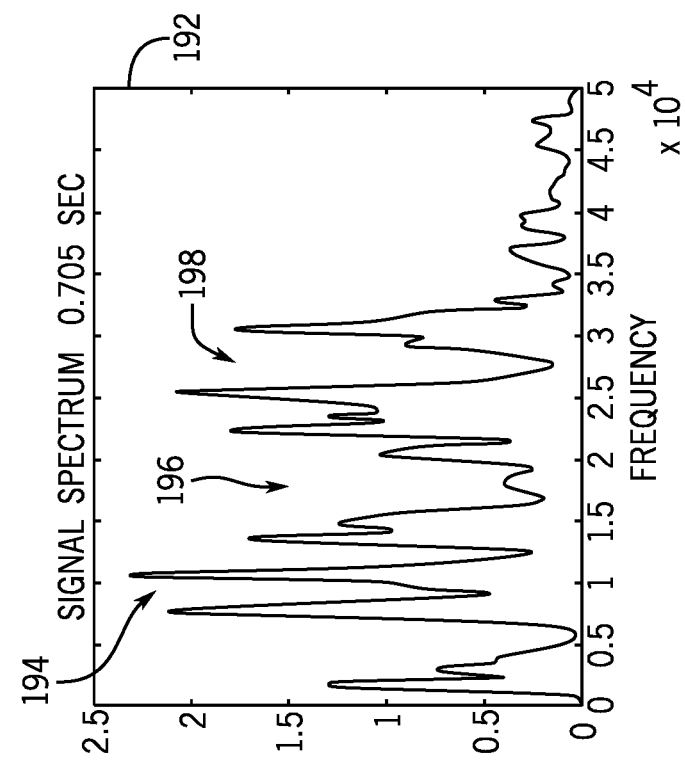
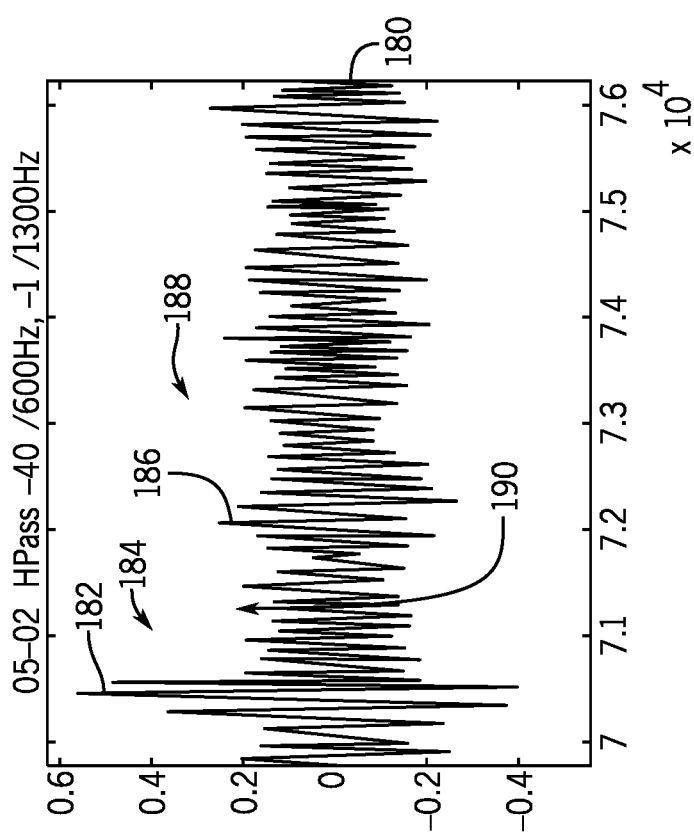
FIG. 13B
FIG. 13A

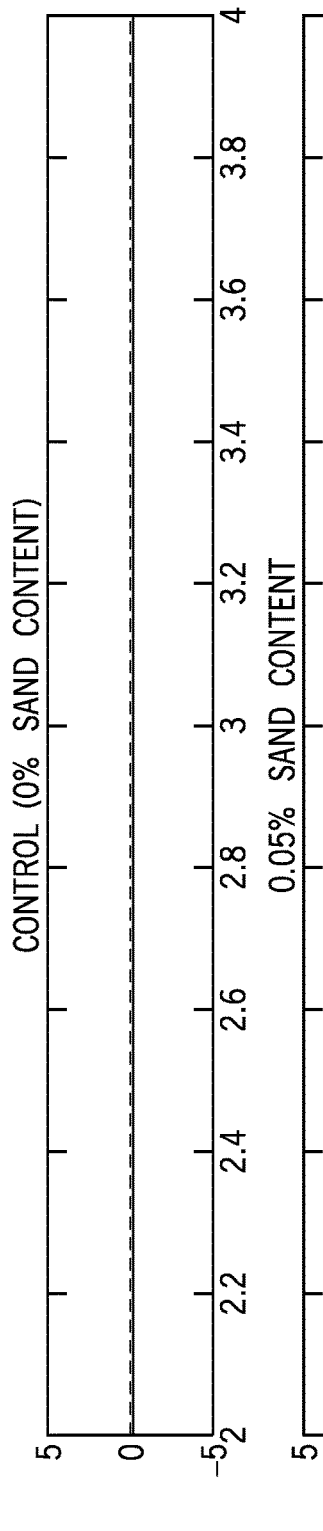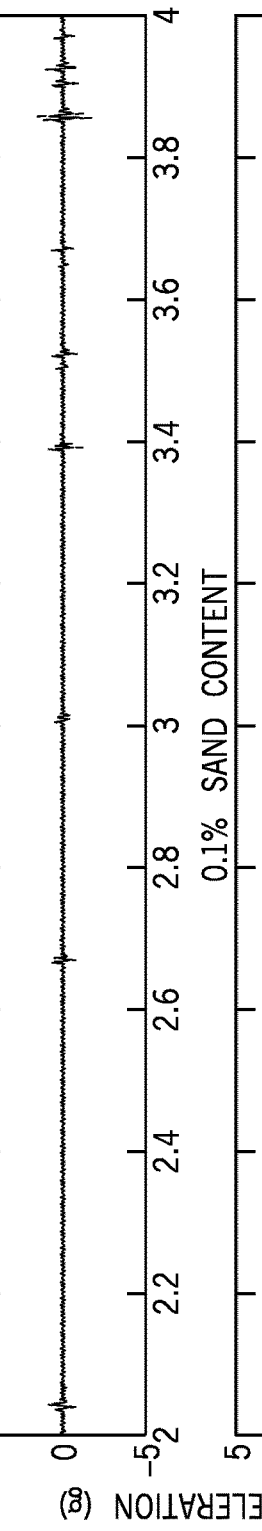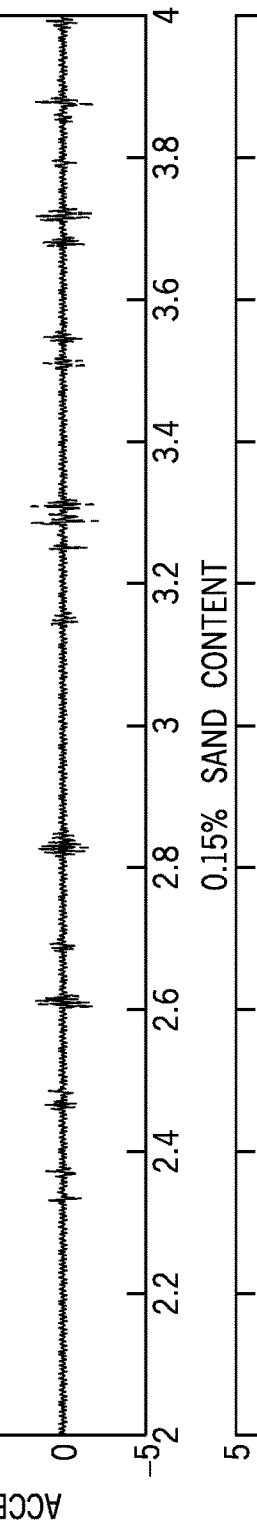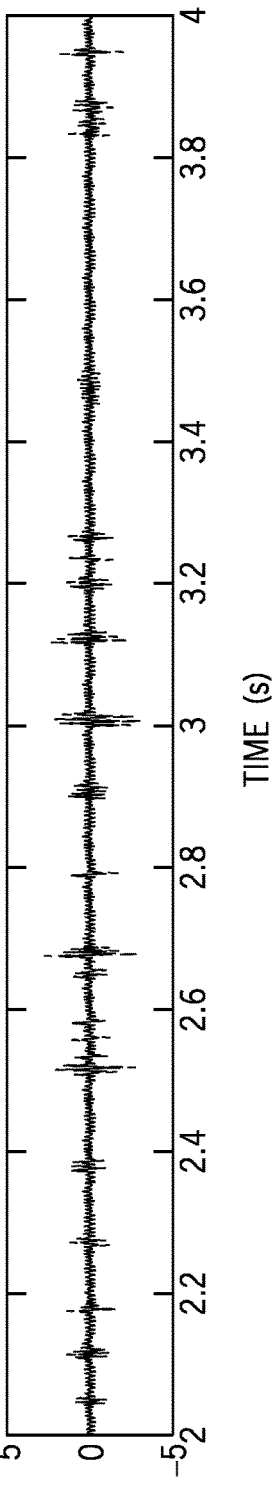

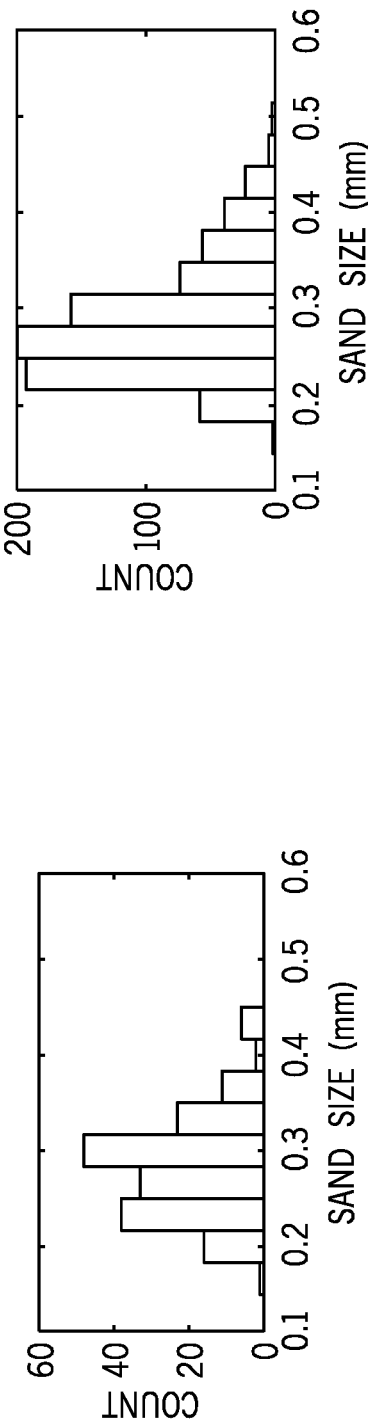
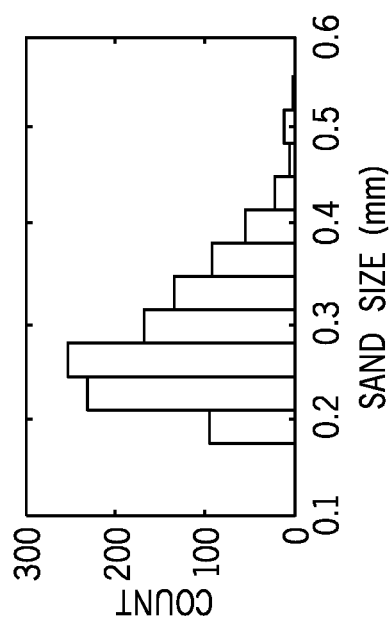
FIG. 20A
FIG. 20B
FIG. 20C

SYSTEM AND METHOD FOR ASSESSING SAND FLOW RATE

CROSS REFERENCE TO RELATED APPLICATIONS

This application claims priority to and the benefit of U.S. Provisional Application Ser. No. 62/548,479 filed Aug. 22, 2017 titled "SYSTEM AND METHOD FOR ASSESSING SAND FLOW RATE," the full disclosure of which is hereby incorporated herein by reference in its entirety for all purposes. This application is further a continuation-in-part of co-pending U.S. patent application Ser. No. 15/339,561 filed Oct. 31, 2016 titled "SYSTEMS AND METHODS FOR DETECTING SOLID PARTICLES," the full disclosure of which is hereby incorporated herein by reference in its entirety for all purposes.

BACKGROUND

1. Field of Invention

This disclosure relates in general to oil and gas tools, and in particular, to systems and methods for downhole imaging operations.

2. Description of the Prior Art

In oil and gas production, in addition to production of water & hydrocarbons certain wells under certain circumstances may experience sand ingress during hydrocarbon recovery. There are several origins of sand and solid materials in the wellbore. In unconsolidated formations, sand and fines may exist in the reservoir rock. As pressure in the reservoir reduces, the fines may dislodge and get conveyed to the wellbore. Sand and fines control mechanisms installed to control movement of sand and fines such as sand screens, gravel packs or chemical treatments may fail to restrain sand and fines migration. Other sources of sand in the well bore include processes such as hydraulic fracturing. During the hydraulic fracturing process, hydraulic pressure is applied to the formation to break the formation and develop large fractures or conduits connecting the wellbore to the formation reservoir. In order to keep the conduits propped open sand and manmade proppants are injected in the fractures along with the fracturing fluid. After the fracture creation process is over, hydraulic pressure is relieved, thereby trapping sand between the fracture and keeping the fracture open. If the sand starts migrating from the fracture into the wellbore, it fails to complete its function of keeping the fractures open and therefore has a deleterious effect on the hydrocarbon production. Another source of sand in the wellbore occurs during early sand screenout, where sand and proppants that are not lodged into the formation remain in the wellbore. These solids flow back out of the wellbore during the production commissioning and the process is termed "flow back". This sand is directed uphole and may be recovered in a sand separator system arranged at a surface. The flow rate of the sand may be determined by evaluating a quantity of sand (e.g., weight) over a period of time that is positioned in the separator. The sand quantity provides an estimate of the sand quantity produced over a period of time, missing out on any large sand slugs that could skew the results. In addition, this process also misses any sand that is carried further downstream of the sand separation system. The method of quantifying sand production is laborious, prone to errors with significant human exposure to hazardous operating environment, and is costly and disruptive, as the sand is physically removed from the separator and weighed in a container, such as a bucket. Moreover, the flow rate of the sand is determined after the fact and may be obtained too late in the recovery process to effectively remediate the flow. It is now recognized that improved methods of determining sand flow rates are desired.

SUMMARY

Applicant recognized the problems noted above herein and conceived and developed embodiments of systems and methods, according to the present disclosure, for imaging operations.

In an embodiment, a method includes receiving first impact data from a first sensor arranged proximate a flow line, first impact data comprising a first indication of energy transmitted by a particle suspended within a fluid flowing through the flow line. The method also includes receiving second impact data from a second sensor arranged proximate the flow line, the second impact data comprising a second indication of energy transmitted by the particle suspended within the fluid flowing through the flow line. The method includes comparing the first impact data and the second impact data for corresponding signatures associated with an increased energy transmission from the particle. The method further includes determining one or more particulate properties based at least in part on the energy transmission associated with the corresponding signature.

In another embodiment, a computing device includes a microprocessor and memory. The memory includes instructions that, when executed by the microprocessor, cause the computing device to obtain impact data corresponding to energy transfer within a flow line from two or more sensors, the energy transfer associated with solid particles within a fluid in the flow line. The instructions also cause the computing device to apply at least one filter to the impact data, the at least one filter discriminating noise within the impact data. The instructions also cause the computing device to identify a signature in the impact data. The instructions also cause the computing device to determine a characteristic of the signature that meets a criteria. The instructions also cause the computing device to determine a property of at least one of the fluid or the solid particles, based at least in part on the characteristics of the signature. In various embodiments, the computing device may apply a discriminating filter on the impact data to specifically identify a time frequency signature typically produced by sand impact. The instructions would then cause the computing device to reject all signals that do not conform to the identified sand impact signature. The instructions would account for time and frequency scaling of the signature to enable discriminating sand impact signals where variables such as flow velocity, water cut, gas cut, temperature, fluid viscosity and other fluid properties may have changed over the course of the measurements.

In an embodiment, a solids management system for determining a property of a flow within a flow line includes a solids detector, a microprocessor, and memory. The solids detector is along a flow line, the flow line transporting a fluid having solid particles and includes a receptor extending at least partially into the flow line. The solids detector also includes a first sensor coupled to a first end of the receptor. The solids detector further includes a second sensor coupled to the second end of the receptor; wherein the solid particles transmit energy to the receptor, upon impact, and the energy is measured by the first sensor and the second sensor. The memory includes instructions that, when executed by the microprocessor, cause the solids management system to obtain first impact data from the first sensor corresponding to the energy transmitted to the receptor by the solid particles. The instructions also cause the solids management system to obtain second impact data from the second sensor corresponding to the energy transmitted to the receptor by the solid particles. The instructions also cause the solids management system to apply a filter to the first impact data and to the second impact data, the at least one filter reducing noise within the first impact data and to the second impact data. The instructions also cause the solids management system to identify a signature in the first impact data and in the second impact data, the signature including a rising portion and a decaying portion, a characteristic of the signature being indicative of a quantity of energy transmitted to the receptor. The instructions also cause the solids management system to determine a characteristic of the identified signature meets a criteria. The instructions also cause the solids management system to determine a property of at least one of the fluid or the solid particles, based at least in part on the characteristic of the identified signature.

BRIEF DESCRIPTION OF THE DRAWINGS

The present technology will be better understood on reading the following detailed description of non-limiting embodiments thereof, and on examining the accompanying drawings, in which:

FIGS. 8A-8E are graphical representations of embodiments of sensing data, in accordance with embodiments of the present disclosure;

FIG. 13A is a graphical representation of an embodiment of raw sensing data, in accordance with embodiments of the present disclosure;

FIGS. 13B-13D are graphical representations of embodiments of wavelet filtered data, in accordance with embodiments of the present disclosure;

FIGS. 14A-14D are graphical representations of embodiments of de-noised data, in accordance with embodiments of the present disclosure;

FIGS. 20A-20C are graphical representations of embodiments of particle distributions, in accordance with embodiments of the present disclosure;

DETAILED DESCRIPTION OF THE INVENTION

Figure 1:
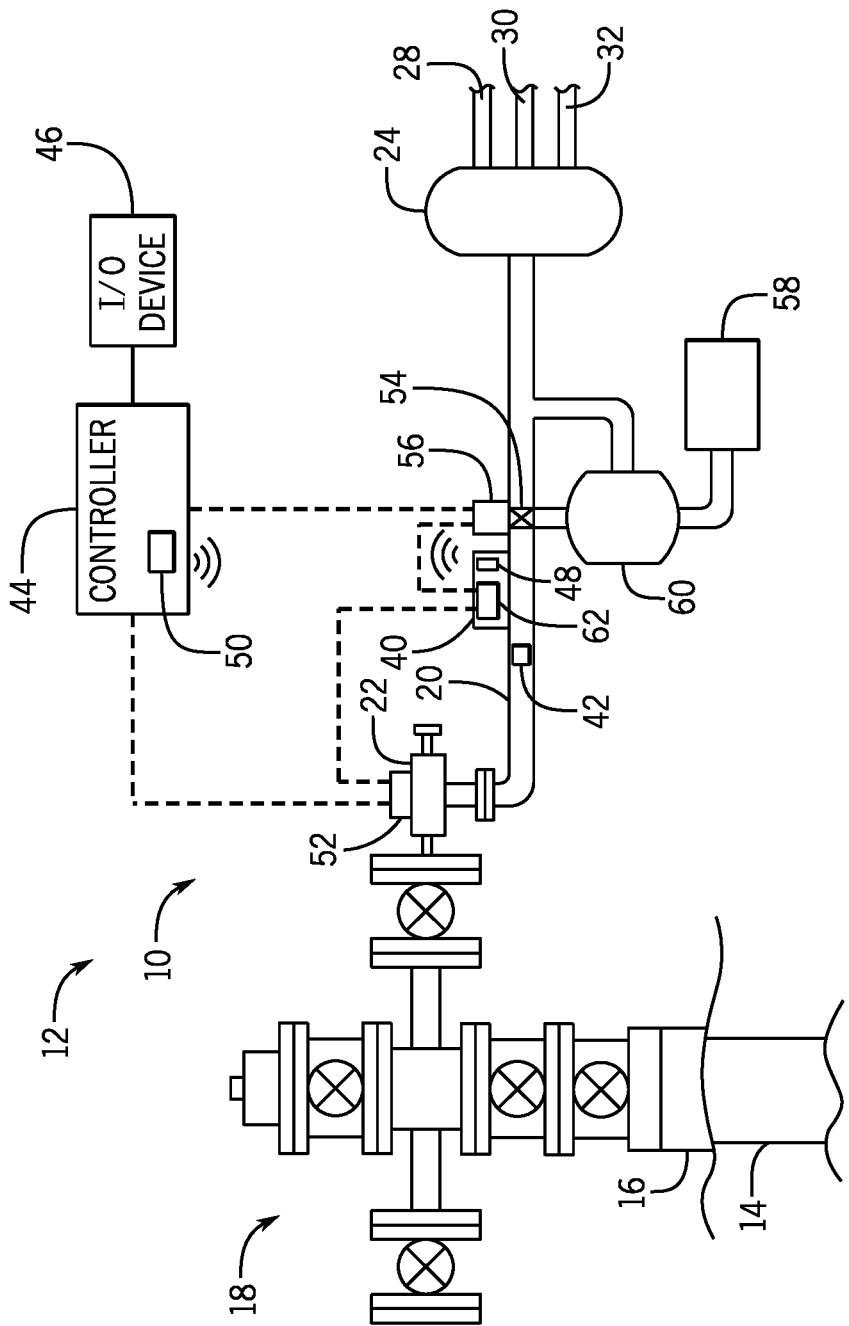
FIG. 1 is a schematic diagram of an embodiment of a solids management system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Additionally, whenever the particle energy is discussed, it should be understood that analogous analysis methods may be applied to evaluate particle momentum and any other particle parameter that is a combination of particle mass and speed.

Embodiments of the present disclosure describe embodiments of systems and methods for determining sand flow rates during hydrocarbon recovery operations. In embodiments, a solids detector (e.g., solids detector) is positioned to interact with a fluid flow to transmit one or more signals related to impacts between components of the solids detector 40 and particles in the flow. Thereafter, this information is processed to identify peaks that may correspond to impact events in which solid particles (e.g., particulates) such as proppant or sand, collide with a sensor probe of the solids detector. These peaks may be evaluated based on energy and/or momentum transfer to determine the sand flow rate and/or particle distribution, among other characteristics. Furthermore, information determined from analyzing the signals may be utilized to control contemporaneous well pad processes such as stimulation or flow back, downstream processes, or plan additional stimulation events. It should be understood that while embodiments of the present disclosure may discuss particulates with reference to sand, that any other type of particulate matter may be detected and analyzed using embodiments of the present disclosure. For example, particulates may be present in fluid flow lines in industries such as oil and gas recovery (e.g., onshore and offshore), pipelines, refining, water treatment systems, power generation systems, and the like.

The present discussion relates to the use of solid detectors (e.g., solid measurement devices or solid sensors) to detect solid particles in a fluid flow and/or to measure one or more characteristics of solid particles in a fluid flow. For example, in certain embodiments, the disclosed solid detector may measure a volume, quantity, concentration, and/or size distribution of solid particles in a fluid flow. In some embodiments, the solids detector may include a receptor that is configured to be impacted by solid particles in the fluid flow. Additionally, the solids detector may include a sensor that is configured to generate an electrical signal based on the impact, such as due to an accelerometer, generated in response to the solid particles impacting the receptor. In some embodiments, the sensor may include the receptor. In certain embodiments, the sensor may be affixed to the receptor, and the receptor may be configured to transfer data to the sensor. In some embodiments, the receptor and the sensor of the solids detector may be coupled to a valve body of a valve.

Additionally, as discussed below, the electrical signal generated by the sensor may be used to control a system having the fluid to reduce erosion and/or damage that may result from the solid particles in the fluid. In some embodiments, a controller of the system may determine one or more actions based on an analysis of the electrical signal, and the one or more actions, when executed, may reduce or block damage to one or more components of the system. In certain embodiments, the one or more actions may adjust a flow rate of the fluid in the system or a flow path of the fluid through the system. For example, the one or more actions may include adjusting a position of a choke to adjust a flow rate of the fluid or adjusting a position of a valve disposed in a conduit configured to flow the fluid to adjust a flow path of the fluid through the system.

Turning to the figures, FIG. 1 illustrates an embodiment of a solids management system 10 configured to detect solid particles (e.g., solids, sand, rocks, proppant, ceramic particles, etc.) in a fluid flow. In the illustrated embodiment, the solids management system 10 is used with an oil and/or gas production system 12 configured to extract or produce oil and/or gas from a well 14 (e.g., an oil well and/or a gas well) extending into a subterranean formation containing oil and/or gas. However, it should be appreciated that the solids management system 10 may be used with any suitable system configured to flow a fluid that may include one or more solid particles.

The oil and/or gas production system 12 may include a wellhead 16 configured to establish fluid communication with the well 14. Additionally, the oil and/or gas production system 12 may include a tree 18 (e.g., a production tree, a Christmas tree, etc.) configured to couple to the wellhead 16. The tree 18 may include a variety of flow paths, valves, fittings, and controls for controlling the flow of fluids into and out of the well 14. During operation, the tree 18 may route fluids (e.g., production fluid) produced by the well 14 to a production flowline 20. The production fluid may include oil, gas, and/or water.

In some embodiments, the tree 18 may be coupled to the production flowline 20 via a flow control device 22 (e.g., a choke, a choke valve). In some embodiments, the tree 18 may include the flow control device 22. The flow control device 22 may be configured to control the flow of the production fluid from the well 14 and/or to control the pressure in the well 14. For example, in some embodiments, decreasing the size of an opening of the flow control device 22 may decrease the flow rate of the production fluid from the well 14 and may increase the pressure in the well 14. Additionally, increasing the size of the opening of the flow control device 22 may increase the flow rate of the production fluid from the well 14 and may decrease the pressure in the well 14.

The production flowline 20 may be configured to route the production fluid to one or more oil and/or gas processing devices 24 (e.g., fluid processing devices). It should be appreciated that while the production flowline line 20 is illustrated as a single flowline, the production flowline 20 may include two or more flowlines (e.g., conduits, pipes, pipelines, jumpers, risers, etc.). Further, it should be appreciated that while the production flowline line 20 is illustrated as directly coupled to the one or more oil and/or gas processing devices 24, the production flowline 20 may be coupled to (e.g., indirectly coupled to) the one or more gas/processing devices 24 via one or more intermediate components (e.g., manifolds, pipeline end terminations, etc.). Additionally, there may be parallel lines performing the same functionality and including duplicate components.

In certain embodiments, the one or more oil and/or gas processing devices 24 may include distillation columns, rotating machinery, pumps, compressors, heat exchangers, separators, or any other suitable equipment. For example, as illustrated, the one or more oil and/or gas processing devices 24 may include one or more separators (e.g., gas/liquid separators, liquid/liquid separators, oil/gas/water separators, etc.) configured to separate oil, gas, and water in the production fluid into separate components. The one or more separators may be configured to route the oil to an oil flowline 28, the gas to a gas flowline 30, and the water to a water flowline 32.

As noted above, the production fluid may include oil, gas, and/or water. In some situations, the production fluid may also include solid particles, such as sand and/or rocks from the subterranean formation. In some embodiments, the oil and/or gas production system 12 may include a hydraulic fracturing system (e.g., a fracking system or fracing system), which may be configured to increase the production of oil and/or gas from the well 14 by pumping a fluid (e.g., a fracturing fluid) containing a proppant (e.g., solid particles, sand, ceramic particles, etc.) into the subterranean formation at a high pressure. In particular, the high pressure fracturing fluid may create fractures (e.g., cracks) in the subterranean formation and/or may increase the size of pre-existing fractures in the subterranean formation to facilitate the release of oil and gas from the subterranean formation. While most of the injected fracturing fluid may remain underground, a portion of the injected fracturing fluid may return to the surface and is typically referred to as "flowback." As such, the production fluid may include proppant from the fracturing fluid. The solid particles in the production fluid may erode and/or damage various components of the oil and/or gas production system 12, such as the production flowline 20, the one or more oil and/or gas processing devices 24, and/or the flow control device 22, which may reduce the life of the various components and may increase the downtime and operating costs of the oil and/or gas production system 12 associated with repairing and/or replacing damaged components.

As discussed below, the solids management system 10 may be configured to detect solid particles in the production fluid and/or to measure one or more parameters of the solid particles in the production fluid, such as the volume, quantity, concentration, and/or size distribution of solid particles in the production fluid. Additionally, as discussed below, the solids management system 10 may be configured to determine one or more actions (e.g., control actions, operational decisions, etc.) based on the detection of solid particles in the production fluid and/or based on the measured parameters of the solid particles in the production fluid. In particular, the solids management system 10 may be configured to determine one or more actions that, when executed, may reduce, block, or prevent erosion and/or damage to one or more components of the oil and/or gas production system 12 caused by solid particles in the production fluid. Further, the solids management system 10 may be configured to automatically execute the one or more determined actions and/or to provide user-perceivable indications indicative of the one or more determined actions to a user (e.g., via an output device), which may prompt the user to execute the one or more determined actions. Additionally, in embodiments, the solids management system 10 may enable real-time or near real-time (e.g., without significant delay) management of flow processes and/or determination of future operations for the wellbore. For example, data may indicate that fracturing proppant is not staying in the downhole well to maintain the fissures, and as a result, additional procedures may be scheduled preemptively based on the determined flow rates within the system. As such, the solids management system 10 may facilitate the reduction of damage to one or more components of the oil and/or gas production system 12 caused by solid particles in the production fluid, which may increase the life of the one or more components and may decrease the downtime and operating costs of the oil and/or gas production system 12. Furthermore, future operations may be planned based on information determined from the system.

With the foregoing in mind, the solids management system 10 may include one or more solids detectors 40 (e.g., solids measurement devices, solids sensors, sand detectors, etc.) configured to detect the presence of one or more solid particles in the production fluid. In certain embodiments, the one or more solids detectors 40 may be configured to measure one or more parameters of the solid particles in the production fluid, such as a volume, quantity, concentration, and/or size distribution of solid particles in the production fluid. In some embodiments, the one or more solids detectors 40 may be configured to measure flow rate of the production fluid. In certain embodiments, the solids management system 10 may include one or more flow meters 42 configured to measure the flow rate of the production fluid.

As discussed in below with respect to FIGS. 2-4, in some embodiments, the one or more solids detectors 40 may include accelerometers that are configured to convert a transfer of energy into an electrical signal. However, it should be appreciated the solids management system 10 may include any suitable type of solids detectors 40, such as acoustic sensors, laser diffraction sensors, sonar sensors, ultrasonic sensors, Doppler effect sensors, optical sensors (e.g., infrared sensors, fiber optic sensors, etc.), and so forth. The solids detectors 40 and the flow meters 42 may be disposed about any suitable location of the oil and/or gas production system 12 to monitor the production fluid. In some embodiments, the solids detectors 40 and the flow meters 42 may be disposed downstream of the well 14 and upstream of the one or more oil and/or gas processing devices 24. For example, one or more solids detectors 40 and/or one or more flow meters 42 may be disposed in or on the production flowline 20, the flow control device 22, the tree 18, and/or the wellhead 16.

In some embodiments, the solids management system 10 may include a controller 44, which may include or may be operatively coupled to an input/output (I/O) device 46 configured to receive inputs from a user and/or to provide information to a user. For example, the I/O device 46 may include a display, computer, monitor, cellular or smart phone, tablet, other handheld device, speaker, keyboard, or the like. The controller 44 may be configured to receive data (e.g., signals, sensor feedback, etc.) from the one or more solids detectors 40. For example, one or more solids detectors 40 may include a wireless transmitter 48 (e.g., a wireless transceiver) configured to wirelessly transmit data to a wireless receiver 50 (e.g., a wireless transceiver) of the controller 44. In certain embodiments, the wireless transmitter 48 may be configured to wirelessly transmit the data to a cloud-based system (e.g., a cloud server, a cloud storage device, etc.), and the controller 44 may be configured to download the data from the cloud-based system. In some embodiments, one or more solids detectors 40 may be communicatively coupled to the controller 44 via a wired connection (e.g., a cable). Additionally, the controller 44 may be configured to receive data from the one or more flow meters 42 via a wireless connection (e.g., a wireless transmitter of the flow meter 42), via a wired connection, or via the cloud-based system.

The solids detectors 40 may be configured to transmit raw data, processed data, and/or measured parameters of the solid particles in the production fluid to the controller 44. In certain embodiments, the controller 44 may be configured to determine one or more parameters of the solid particles in the production fluid (e.g., solids parameters), such as volume, quantity, concentration, and/or size distribution, based on raw and/or processed data from the solids detectors 40. Additionally, the controller 44 may cause the I/O device 46 to provide one or more user-perceivable indications relating to the one or more solids parameters. For example, the controller 44 may cause the I/O device 46 to display the one or more measured solids parameters. The measured solids parameters may facilitate a user in assessing possible erosion of the oil and/or gas production system 12, as well as assessing the subterranean formation and the hydraulic fracturing operation.

Further, in some embodiments, the controller 44 may be configured to determine one or more actions (e.g., a control action, an operational decision, etc.) based on the detection of solid particles in the production fluid and/or based on the measured solids parameters. In particular, the controller 44 may determine one or more actions that, when executed, may reduce, block, or prevent erosion and/or damage to one or more components of the oil and/or gas production system 12 caused by solid particles in the production fluid. For example, erosion and/or damage may be reduced, blocked, or prevented by stopping the flow of the production fluid from the well 14 or by reducing the flow rate of the production fluid from the well 14. Additionally, erosion and/or damage may be reduced by increasing the pressure in the well 14. In particular, the pressure differential between the well 14 and the surrounding subterranean formation may cause sand to flow from the subterranean formation to the well 14. Thus, increasing the pressure of the well 14 may decrease the pressure differential, thereby reducing the likelihood of sand entering the well 14 from the subterranean formation. As noted above, the size of the opening of the flow control device 22 (e.g., choke) may adjusted to adjust the flow of production fluid from the well 14 and the pressure in the well 14. In some embodiments, an actuator 52 may be configured to adjust the size of the opening of the flow control device 22. In certain embodiments, the actuator 52 may include one or more of a manual actuator, an electric actuator, a hydraulic actuator, or a pneumatic actuator.

Accordingly, in some embodiments, the controller 44 may determine that the size of the opening of the flow control device 22 should be adjusted (e.g., reduced) to reduce the flow rate of production fluid from the well 14, to stop the flow of production fluid from the well 14 (e.g., during well shut down or well shut-in), or to increase the pressure in the well 14 based on an analysis of one or more measured solids parameters. For example, the controller 44 may determine that the size of the opening of the flow control device 22 should be adjusted (e.g., reduced) in response to a determination that one or more measured solid parameters violate a respective threshold (e.g., greater than an upper threshold or less than a lower threshold). In certain embodiments, the controller 44 may determine that the size of the opening of the flow control device 22 should be adjusted (e.g., increased) to increase the flow rate of production fluid from the well 14 and/or to decrease the pressure of fluid from the well 14 in response to a determination that the one or more measured solids parameters do not violate respective thresholds.

In some embodiments, the controller 44 may determine a size for the opening of the flow control device 22 based on an analysis of one or more measured solids parameters, such as by comparing one or more measured solids parameters to one or more respective thresholds. For example, the controller 44 may compare a measured solids parameter to a plurality of tiered or graded thresholds that successively increase in value, and each threshold may be associated with a size for the opening of the flow control device 22. By way of example, the controller 44 may determine a first size for the opening if a measured solids parameter is greater than a first threshold. Additionally, the controller 44 may determine a second size for the opening that reduces the flow rate of the production fluid from the well 14 and increases the pressure in the well 14 as compared to the first size if the measured solids parameter is greater than a second threshold that is greater than the first threshold.

Further, in some embodiments, the controller 44 may determine that the flow rate of production fluid from the well 14 should be reduced and/or the pressure in the well 14 should be increased to a greater extent in response to a determination that two or more measured solids parameters each violate a respective threshold. For example, the controller 44 may compare a first solids parameter (e.g., size or diameter of the solid particles) to a first threshold associated with a first size of the opening and may compare a second solids parameter (e.g., flow rate, concentration, etc.) to a second threshold associated with a second size of the opening. In certain embodiments, the controller 44 may determine that the opening of the flow control device 22 should be adjusted to a third size that results in a reduced production fluid flow rate and an increased well pressure as compared to the first and second sizes in response to a determination that the first and second measured solids parameters each violate the respective threshold.

Additionally, erosion and/or damage to components of the oil and/or gas production system 12 may be reduced, blocked, or prevented by adjusting the flow path of the production fluid through the oil and/or gas production system 12. For example, erosion and/or damage to the oil and/or gas processing devices 24 may be reduced, blocked, or prevented by diverting the flow of the production fluid from the oil and/or gas processing devices 24. In some embodiments, the oil and/or gas production system 12 may include a bypass valve 54 disposed in the production flow line 20 that may be controlled to divert the production fluid from the oil and/or gas processing devices 24. For example, the bypass valve 54 that may be configured to route the production fluid to the oil and/or gas processing devices 24 when the bypass valve 54 is in a first position (e.g., an open position) and to divert the production fluid away from the oil and/or gas processing devices 24 when the bypass valve 54 is in a second position (e.g., a closed position). In certain embodiments, an actuator 56 may be configured to adjust the position of the bypass valve 54. In some embodiments, the actuator 56 may include one or more of a manual actuator, an electric actuator, a hydraulic actuator, or a pneumatic actuator. Further, in some embodiments, the bypass valve 54 may be configured to route the production fluid to a solids tank 58 (e.g., a sand tank, a frack tank, etc.) when the bypass valve 54 is in the second position. In certain embodiments, the bypass valve 54 may be configured to route the production fluid to a solids separator 60 (e.g., a sand separator) configured to separate or remove the solid particles from the production fluid. The separated solid particles may be routed from the solids separator 60 to the solids tank 58. In certain embodiments, the resulting production fluid (e.g., containing oil, gas, and/or water) may be routed from the solids separator 60 to the oil and/or gas processing devices 24.

Accordingly, in some embodiments, the controller 44 may determine that the production fluid should be diverted from the oil and/or gas processing devices 24 in response to a determination that the production fluid includes solid particles or in response to a determination that one or more measured solids parameters violates a respective threshold. For example, the controller 44 may determine that the bypass valve 54 should be actuated to the second position in response to a determination that the production fluid includes solid particles or in response to a determination that one or more measured solids parameters violates a respective threshold. Further, the controller 44 may continue to monitor the production fluid while the bypass valve 54 is in the second position to determine when the bypass valve 54 should be actuated to the first position. For example, the controller 44 may determine that the bypass valve 54 should be actuated to the first position in response to a determination that the production fluid does not include solid particles or in response to a determination that the measured solids parameters do not violate respective thresholds.

Further, in some embodiments, the controller 44 may cause the I/O device 46 to provide user-perceivable indications (e.g., alerts, alarms, messages, graphical indications, etc.) indicative of the one or more determined actions (e.g., adjusting the size of the opening of the flow control device 22 and/or adjusting the position of the bypass valve 54) to a user. For example, the controller 44 may cause the I/O device 46 to display the one or more determined actions, which may prompt the user to execute the one or more determined actions. For example, the user may manually adjust the actuator 56 to adjust the size of the opening of the flow control device 22 and/or may manually adjust the actuator 56 to adjust the position of the bypass valve 54.

In certain embodiments, the controller 44 may be configured to automatically execute the one or more determined actions. For example, the controller 44 may be configured to send a control signal (e.g., a wired and/or wireless control signal) to the actuator 52, which may cause the actuator 52 to adjust the size of the opening of the flow control device 22 (e.g., to a size specified by the control signal). Additionally, the controller 44 may 44 may be configured to send a control signal (e.g., a wired and/or wireless control signal) to the actuator 56, which may cause the actuator 56 to adjust the position of the bypass valve 54.

In some embodiments, the solids detector 40 may include a controller 62 configured to perform one or more of the above-described functions of the controller 44. For example, the controller 62 may determine one or more actions (e.g., adjusting the size of the opening of the flow control device 22 and/or adjusting the position of the bypass valve 54) based on the detection of solid particles in the production fluid and/or based on the measured solids parameters, as discussed above with respect to the controller 44. Additionally, in certain embodiments, the controller 62 may be configured to automatically execute the determined actions, as discussed above with respect to the controller 44. Further, in certain embodiments, the controller 62 may be configured to cause the I/O device 46 to display the determined actions. For example, the controller 62 may transmit the determined actions to the controller 44, which may cause the I/O device 46 to display the determined actions. In some embodiments, the controller 44 may determine the actions and may cause the controller 62 to execute the determined actions. Further, in certain embodiments, a user may input a desired action via the I/O device 46, and the controller 44 and/or the controller 62 may be configured to execute the action inputted by the user. For example, the user may determine an action based on one or more measured solids parameters displayed on the I/O device 46.

Figure 2:
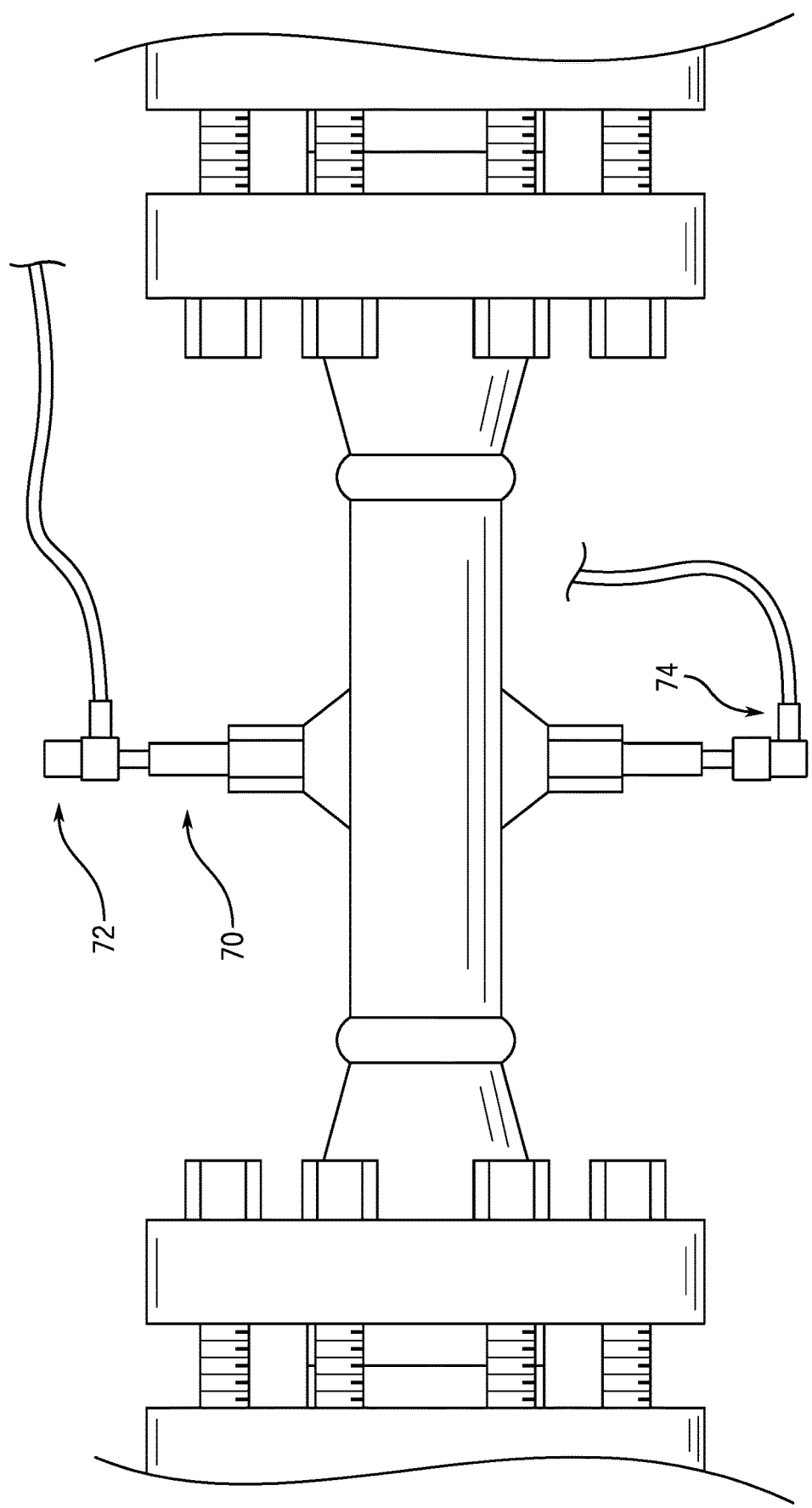
FIG. 2 is an isometric view of an embodiment of a sensor arrangement, in accordance with embodiments of the present disclosure.

FIG. 2 is an isometric view of an embodiment of the solids detector 40. It should be appreciated that the disclosed solids detector 40 may be substantially similar to the solids detector 40 disclosed in U.S. patent application Ser. No. 15/339, 561, titled Systems and Methods for Detecting Solid Particles, filed Oct. 31, 2016, which is hereby incorporated by reference in its entirety. The solids detector 40 includes a sensor probe 70 and a pair of detectors 72, 74 arranged at ends of the sensor probe 70. It should be appreciated that, in various embodiments, the detectors 72, 74 may also be referred to as sensors. In certain embodiments, the detectors 72, 74 are accelerometers that measure vibration or movement of the sensor probe 70, for example, due to contact with flowing sand particles. In embodiments, the solids detector 40 may be arranged on a spool having one or more flanged connections and may be installed upstream of a separator, downstream of the separator, or at any reasonable location at the well site.

Figure 3:
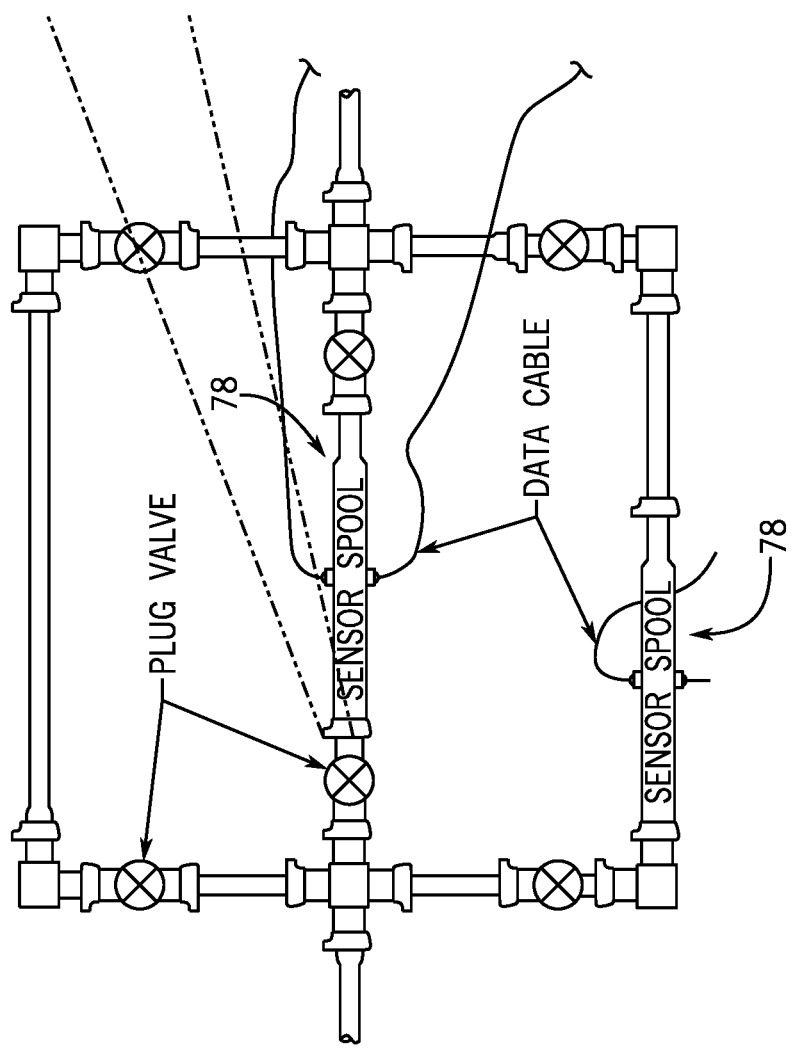
FIG. 3 is top plan schematic view of an embodiment of a sensing spool arranged in a flow line, in accordance with embodiments of the present disclosure.

FIG. 3 is a schematic view of an embodiment of the solids detector 40 on a spool 78 arranged in production piping, such as the flowline 20. As described above in various embodiments, redundant or duplicate solids detectors 40 may be arranged in various portions of the flowline 20. Furthermore, in embodiments, information the pair of detectors 40 may be utilized to identify the flow of solids. For example, as will be described below, an indication of solids in a first detector but not a second detector may be indicative of an anomaly and not indicative of the actual flow rate. Accordingly, as will be described, the signals may be multiplied together to provide further identification of detection events and smooth out small peaks or anomalous behavior. In the illustrated embodiment, a pair of sensing spools 78 is positioned within the flowline 20 along different legs. In certain embodiments, the pair of sensing spools 78 may act as a redundancy to evaluate the sand flow rate. However, in certain embodiments, the sensing spools 78 may be on different legs to enable one spool 7 to be closed in, for example for maintenance, while still enabling measurements via the other spool 78.

In various embodiments, the solids detector 40 is positioned on a tubular with a sensor probe extending through the tubular and arranged within a flow stream that may include hydrocarbons (e.g., liquid hydrocarbons, gas hydrocarbons, multi-phase hydrocarbons, etc.), liquids, sand particles, gravel packing, dirt, cement, or any other materials that may be downhole. The sensor probe may be coupled to a pair of accelerometers at either end that are communicatively coupled to a controller via the data cables. It should be appreciated that in other embodiments the detectors may not be accelerometers and can be any type of detector that may evaluate impact on the sensor probe. Further, in some embodiments only one detector may be utilized, and in some embodiments more than two detectors may be utilized. It should be appreciated that any reasonable number of sensors may be incorporated to monitor impacts within the flow line. As will be described below, the solids detector 40 may be utilized to collect data associated with flow through the tubular for later processing and evaluation.

Figure 4:
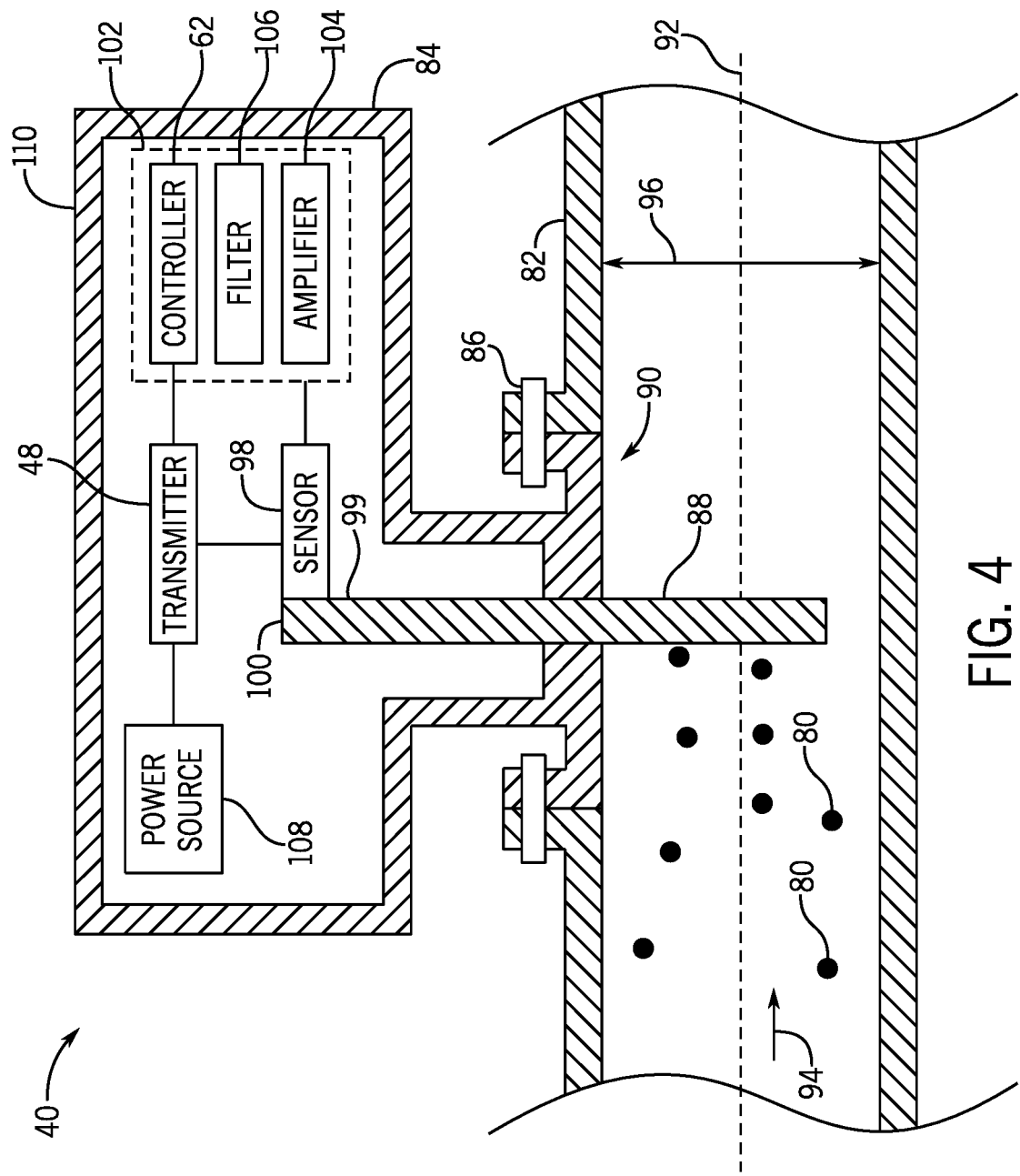
FIG. 4 is a cross-sectional side view of an embodiment of a solids detector, in accordance with embodiments of the present disclosure.

FIG. 4 illustrates a schematic of an embodiment of the solids detector 40 configured to acoustically detect the presence of one or more solid particles 80 entrained in a fluid flowing through a conduit 82 (e.g., a pipe, a flowline, etc.). In some embodiments, the conduit 82 may be the production flowline 20 that is configured to flow the production fluid from the wellhead assembly 18. The solid particles 80 may include sand particles, ceramic particles, proppant, rocks, and/or debris.

As illustrated, the solids detector 40 may include a housing 84 (e.g., body) that is configured to be coupled to the conduit 82. In certain embodiments, the housing 84 may be coupled to the conduit 82 via one or more fasteners 86, such as one or more bolts, screws, nuts, threaded connections, and the like. While the housing 84 is illustrated as a single structural component in FIG. 4, in some embodiments, the housing 84 may include two or more structural components, which may be coupled to one another. In some embodiments, the housing 84 may include a flange, such as a blind flange (e.g., a plate) configured to cover an end of the conduit 82, or a flange joint (e.g., a ring) configured to couple the conduit 82 to another conduit. Further, as discussed below, in some embodiments, the housing 84 may include the housing (e.g., body) of a valve, such as a butterfly valve, a ball valve, a globe valve, or a gate valve, or the housing of a flowmeter, such as the flowmeter 42.

Additionally, the solids detector 40 may include a receptor 88 (e.g., a probe, a rod, etc.) configured to be impacted by one or more of the solid particles 80 entrained in the fluid. As illustrated, the receptor 88 may extend through an opening 90 formed in the conduit 82 when the housing 84 is coupled to the conduit 82. In some embodiments, the receptor 88 may be coupled to the housing 84. In some embodiments, the receptor 88 may extend substantially crosswise (e.g., perpendicular) to a longitudinal axis 92 of the conduit 84 and/or crosswise to a flow direction 94 of the fluid through the conduit 82. In some embodiments, the receptor 88 may extend across at least 50%, 60%, 70%, 80%, or 90% of a diameter 96 of the conduit 82. In certain embodiments, as discussed below, the receptor 88 may extend across the entire diameter 96. In some embodiments, the receptor 88 may be cylindrical, rectangular, or any other suitable shape.

Further, the solids detector 40 may include one or more sensors 98 configured to convert impact energy (e.g., mechanical waves, stress/strain waves, vibrations, etc.) into electrical signals. For example, the one or more sensors 98 may include a magnetostrictive sensor, a piezoelectric sensor, an acoustic sensor, and/or a capacitive sensor. The one or more sensors 98 may be acoustically coupled to the receptor 88. For example, in some embodiments, the one or more sensors 98 may be in physical (e.g., mechanical) contact with and/or coupled to (e.g., affixed to) the receptor 88. As illustrated, in some embodiments, the sensor 98 may abut and/or be coupled to a radial surface 99 of the receptor 88 relative to the longitudinal axis 92 of the conduit 82. In certain embodiments, the sensor 98 may abut and/or may be coupled to an axial surface 100 of the receptor 88 relative to the longitudinal axis 92 of the conduit 82. In some embodiments, as discussed below, the sensor 98 and the receptor 88 may be integrally formed. For example, the sensor 98 may include the receptor 88. In certain embodiments, one or more sensors 98 may be coupled to and supported by the housing 84. Additionally, the one or more sensors 98 may be non-rated (e.g., not wet, not exposed to the flow of fluid through the conduit 82). For example, in some embodiments, one or more sensors 98 may be external to the conduit 82 (e.g., disposed in the housing 94). In certain embodiments, as discussed below, one or more sensors 98 may be embedded in the receptor 88 such that the one or more sensors 98 are disposed in the conduit 82 and blocked from the fluid through the conduit 82 by the receptor 88.

During operation, an acoustic wave (e.g., a mechanical wave, a stress/strain wave, a vibration, etc.) may be generated due to one or more of the solid particles 80 impacting the receptor 88. The receptor 88 may transfer the generated acoustic wave to sensor 98. The sensor 98 may generate an electrical signal (e.g., an electrical pulse signal, an output signal, etc.) based on the acoustic wave generated in response to one or more solid particles 80 impacting the receptor 88, and the electrical signal may vary with (e.g., be proportional to) the impact energies of the one or more solid particles 80 that impacted the receptor 88. In various embodiments, the electrical signal may include current, voltage, capacitance, frequency, and/or magnetic field (e.g., magnetic field strength or flux). The impact energy and, by extension, the generated electrical signal may vary with (e.g., be proportional to) the flow rate of the solid particles 80 and the mass of the solid particles 80, which may be correlated with the size (e.g., diameter or volume) of the solid particles 80. Accordingly, as discussed below, the electrical signal may be used to determine one or more parameters of the solid particles 80, such as the mass, size (e.g., diameter, volume, etc.), density, flow rate, quantity, and/or concentration.

In certain embodiments, the receptor 88 may be rigidly coupled to the housing 84 such movement of the receptor 88 relative to the housing 84 is reduced, minimized, or blocked. Additionally, in some embodiments, the receptor 88 may be made from one or more rigid (e.g., stiff) and/or abrasion resistant materials, such as tungsten carbide, silicon carbide, steel (carbon steel, stainless steel, etc.), and so forth. In some embodiments, the receptor 88 may be coated with an abrasion resistant coating. The stiffness or rigidity of the receptor 88 may facilitate the detection of very small impact forces on the receptor 88 and the transfer of acoustic waves generated in response to very small impact forces to the sensor 98. Additionally, it may be desirable to form the receptor 88 from one or more materials that are resistant to abrasion, such as tungsten carbide, silicon carbide, or steel, to reduce erosion of the receptor 88 due to the solid particles 80. In some embodiments, a blind flange (e.g., a plate) configured to cover an end of the conduit 82 may be used as the receptor 88 Further, in some embodiments, as discussed below, the receptor 88 may be formed from one or more conductive materials, such as one or more metals.

In some embodiments, the solids detector 40 may include circuitry 102 (e.g., data acquisition circuitry, processing circuitry, and/or control circuitry). For example, the circuitry 102 may be configured to receive the electrical signal from the sensor 98. In some embodiments, the circuitry 102 may include one or more amplifiers 104 configured to amplify the received electrical signal and/or one or more filters 106 configured to filter the received electrical signal. In some embodiments, the circuitry 102 (e.g., the controller 62) may be configured to dynamically adjust the amplifiers 104 based on the flow rate of the solid particles 80, which may be determined by the solids detector 40 or the flowmeter 42. For example, as discussed below, the one or more filters 106 may be configured to filter the electrical signal based on frequency and/or amplitude, and different frequencies or amplitudes may be correlated with different particle sizes (e.g., diameter, volume, etc.) and/or masses. Further, in some embodiments, the circuitry 102 may include the controller 62. As discussed below, in some embodiments, the controller 62 may be configured to determine one or more parameters of the solid particles 80, such as the mass, size (e.g., diameter, volume, etc.), density, flow rate, quantity, and/or concentration, based on the electrical signal. Additionally, as discussed above, the controller 62 may be configured to determine the one or more actions based on the parameters and/or to execute the one or more actions.

Further, as noted above, the solids detector 40 may include the transmitter 48. The transmitter 48 may be configured to wirelessly transmit a raw (e.g., unprocessed) electrical signal, a processed (e.g., amplified and/or filtered) electrical signal, and/or one or more determined parameters to the controller 44 and/or to a cloud-based system. In certain embodiments, the solids detector 40 may be communicatively coupled to the controller 44 via a wired connection. Further, in some embodiments, the solids detector 40 may include a power source 108 (e.g., a battery, a capacitor, etc.), which may be configured to power the sensor 98, the transmitter 48, and/or the controller 62. The transmitter 48, the circuitry 102, and the power source 108 may be coupled to the housing 84. For example, as illustrated, the transmitter 48, the circuitry 102, and the power source 108 may be disposed within the housing 84. In some embodiments, the transmitter 48, the circuitry 102, and/or the power source 108 may be coupled to an outer surface 110 of the housing 84.

Figure 5:
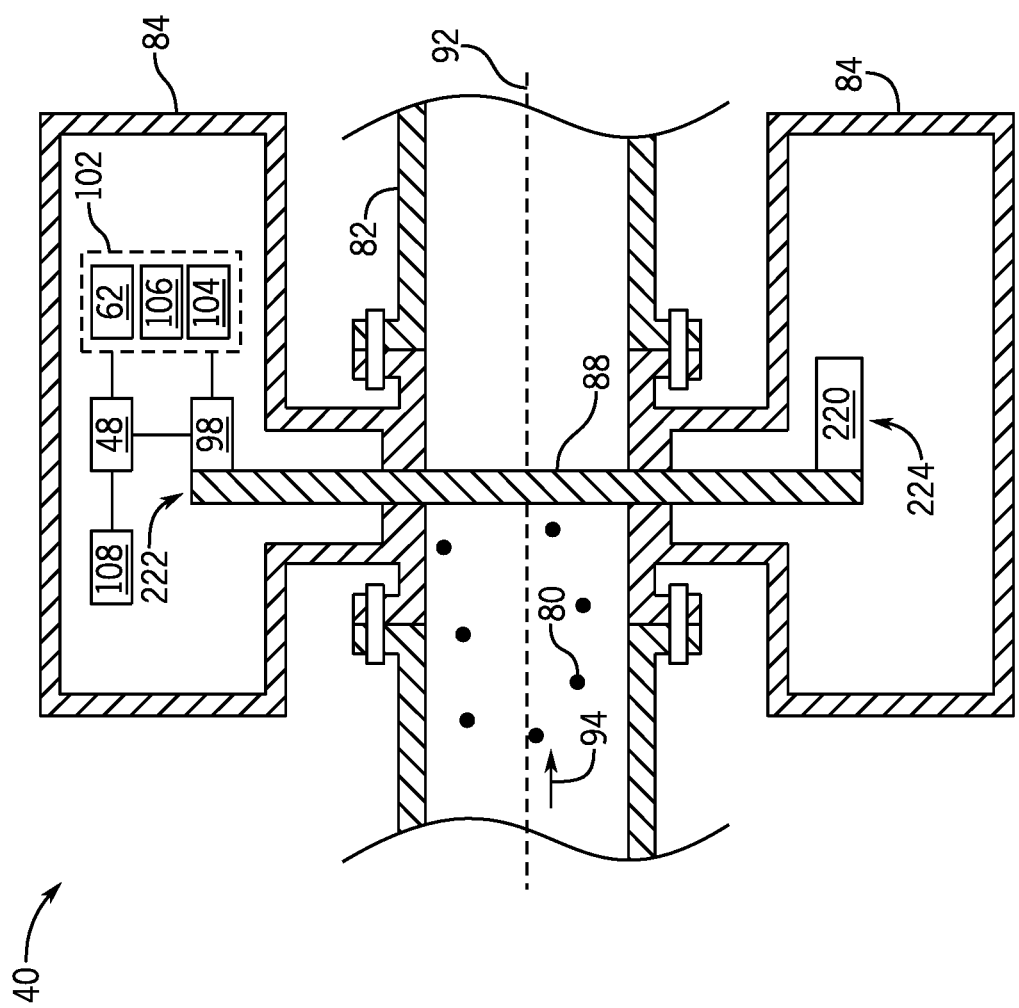
FIG. 5 is a cross-sectional side view of an embodiment of a solids detector, in accordance with embodiments of the present disclosure.

FIG. 5 illustrates an embodiment of the solids detector 40 that includes the receptor 88, the sensor 98, and a second sensor 110. It should be appreciated that the sensor 98 and the second sensor 110 may correspond to the detectors 72, 74, respectively. In particular, the receptor 88 may be acoustically coupled to the sensor 98 and the second sensor 110 such that acoustic waves generated by solid particles 80 impacting the receptor 88 are transferred from the receptor 88 to the sensor 98 and the second sensor 110. For example, the sensor 98 and the second sensor 110 may be in physical contact with and/or coupled to the receptor 88. As illustrated, the sensor 98 may be disposed proximate to a first axial end 112 of the receptor 88, and the sensor 110 may be disposed proximate to a second axial end 114 of the receptor 88 opposite from the first axial end 112. The second sensor 110 may be configured to generate an electrical signal (e.g., an electrical pulse signal, an output signal, etc.) varies with (e.g., is proportional to) the impact energies of the one or more solid particles 80 that impacted the receptor 88 similar to the sensor 98. The second sensor 110 may include the accelerometer, acoustin sensor, magnetostrictive sensor, the capacitive sensor, the piezoelectric sensor, or any other suitable sensor. In some embodiments, the sensor 98 and the second sensor 110 may be the same type of sensor or different types of sensors.

The second sensor 110 may be electrically connected to the circuitry 102, the transmitter 48, and/or the processor 108, and the second sensor 110 may be configured to provide the generated electrical signal to the circuitry 102 and/or the transmitter 48, which may transmit the signal to the controller 44, another processor-based device, or the cloud-based system. The controller 62 and/or the controller 44 may be configured to compare the electrical signals generated by the sensor 98 and the second sensor 110 to determine whether the receptor 88 was impacted by a single solid particle 80 or an aggregate or group of solid particles 80. The controller 62 and/or the controller 44 may be configured to triangulate the location of the impact and process the locational information to assess the size of particle impacting the receptor 88 based on the electrical signals generated by the sensor 98 and the second sensor 220 (e.g., based on a comparison of the electrical signal generated by the sensor 98 and the electrical signal generated by the second sensor 110). For example, the electrical signal generated by sensor 98 (e.g., one or more pulses of the electrical signal generated by the sensor 98) and the electrical signal generated by the second sensor 220 (e.g., one or more pulses of the electrical signal generated by the second sensor 110) may have one or more varying characteristics, such as amplitude, phase, shape, and so forth, that may be analyzed by the controller 62 and/or the controller 44 to determine whether the receptor 88 was impacted by a single solid particle 80 or an aggregate or group of solid particles 80, to triangulate the location of the impacts, and/or and to process the locational information to assess the size of the solid particles that impacted the receptor 88.

Figure 6:
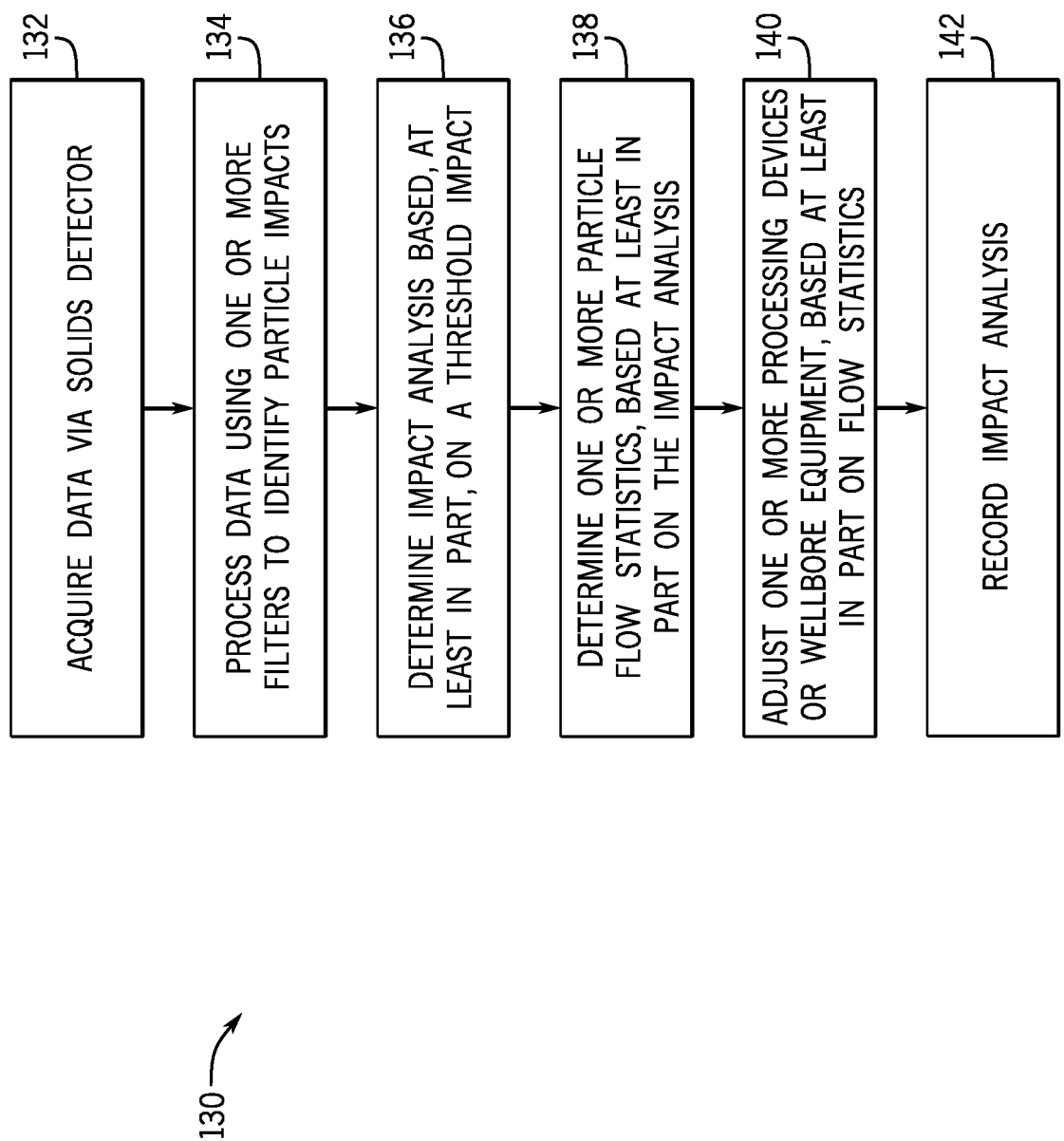
FIG. 6 is a flow chart of an embodiment of a method for determining an impact event, in accordance with embodiments of the present disclosure.

FIG. 6 is an embodiment of a flow chart illustrating a method 130 for data acquisition, processing, analysis, and control. It should be appreciated that for this method, and other method described herein, that various steps may be performed in parallel or in a different order, unless otherwise explicitly stated. Furthermore, fewer or additional steps may be incorporated into the method. In this example, data is acquired via the solids detector 40 (block 132). In various embodiments, a pair of solids detectors 40 are utilized to provide data for processing. Moreover, as described above, the pair of detectors 72, 74 may be utilized to acquire data. As will be described below, in various embodiments information from the detectors 72, 74 may be combined in order to smooth out variations or anomalous readings. In various embodiments, data may be acquired from the detectors 72, 74 and/or the detectors 40 simultaneously. Additionally, the data may be time stamped to enable correlation with additional information and also past processing data, such as fracturing times, well logging information, and the like. It should be appreciated that, in various embodiments, additional sensors may be employed to detect ambient noise with the intent of removing it from the measured signals. Additionally, the data cables coupled to the detectors 40, 72, 74, 98 may transmit information in an analog form. Thereafter, the signals may be subject to filtering to preferentially obtain information relevant to sand impact. For example, the measured signal could be band passed to measure signal with frequency content between 1 KHz and 100 KHz. As such, the band pass filter (e.g., BP filter) may effectively reduce the total quantity of data being processed. This analog signal may then be converted to a digital signal, for example via a data acquisition (DAQ) system having an analog to digital converter. As such, in the first step, the data may be acquired from the system and converted into a digital signal for further processing. It should be appreciated that the data acquisition step, as well as subsequent steps, may be performed continuously as new data is acquired.

The method further includes processing the acquired data using one or more filters (block 134). As noted above, in various embodiments, data transmission may initially be analog based. In order to maximize the ratio of amplitudes of sand impact signal from the ambient noise, the signal may be subjected to several filters. In the illustrated embodiment, the data processing steps utilizes a high pass filter to reduce low frequency ambient noise by passing through signals that have a frequency higher than a certain cutoff frequency and attenuating signals with frequencies lower than the cutoff frequency. It should be appreciated that the frequency response may be particularly selected based on anticipated operating conditions or experimental data. In certain embodiments, a bank of filters, with different characteristics such as frequency response, may be utilized to separate the signal into more than one sub-signal for subsequent processing utilizing methods such as those discussed herein. The data processing step of the illustrated embodiment also includes a wavelet filter. This wavelet filter may be designed using either the ambient noise as input or a single grain impact as the design basis. When using ambient noise as the basis, the wavelet filter coefficients may be selected such that the designed filter rejects all input resembling noise in the signal. Alternatively, when the filter is designed with a single grain impact as the basis, the wavelet filter coefficients may be selected to preferentially reject noise and allow signatures unique to sand impacting the receptor to be unaffected.

In various embodiments, the filter design technique may be interchangeably or in combination be used to develop a denoising filter. For a more robust filter efficiency, the algorithm may use an adaptive technique by selecting and using signals measured by the detectors as a basis to update the filter coefficients as the impact signals change with time and changing ambient conditions. As used herein, a wavelet refers to a time-bound signal. The wavelet may be "short" and have a small duration or be "long" and have a duration longer than the short wavelet. It should be appreciated that different systems may define different durations as long or short. In embodiments, the wavelet filter may operate as a wavelet transform that functions as a time-frequency transformation. The wavelet transform may enable changes in time extension, but not shape, to provide information about the time and frequency of the wavelet. In order to ease the processing complexity, the denoised signal may be further processed, for example using a Hilbert transform and a low pass filter, to represent energy and/or momentum transferred to each detector by the receptor.

In various embodiments, other signal-processing methods to produce the signal envelope such as an absolute-value transform, rectification, or carrier wave demodulation may be substituted for the Hilbert transform. Moreover, one or more of these techniques may be utilized together. If the length of the receptor is much longer than the impact zone, it may be necessary for the acoustic waves generated by the sand impacting the receptor to reach both the detectors 72, 74 at nearly the same time. In one embodiment, this phenomenon may be preferentially used to further reject noise signatures that may resemble sand impacts. For example, noise that may be generated elsewhere in the described system, may travel along different paths to the detectors 72, 74. Therefore the noise signatures will arrive at the detectors 72, 74 at different times or phases. The measurement of certain characteristics, such as amplitudes, from the two detectors 72, 74 could be multiplied to accentuate the signatures arriving from the receptor and minimize the noise signatures arriving from elsewhere. FIGS. 16A-16D graphically demonstrates how the correlation filter based approach reduces spurious signals. Furthermore, various embodiments of the data processing step may also include enveloping to define curves of an oscillating signal, cross-correlation to measure time displacement of particle signals, and/or multiplication of the signals from the detectors to smooth out inconsistencies or potential noise. These processed signals may then be further evaluated via an impact analysis step.

In various embodiments, the method includes determining an impact analysis (block 136). By way of example, FIGS. 18A, 18B, and 19A-19C are graphical representations of energy correlated with impacts. In an embodiment, sand impacts may be identified as a signal level above an established threshold (e.g., impact threshold). In various embodiments, the signal level may correspond to a peak observed in the signal, which may be referred to as a signature. Other representations of a signature may constitute either the time series shape of the signal, the total area under the time series signal, a frequency transform characteristic or any other suitable mathematical transform that advantageously represents sand impact and are included here as alternative embodiments. If the threshold were set at 1, the impact shown in FIG. 17 would register and be evaluated. Alternatively, impacts may be identified based on rise and drop of signals or a combination thereof. Advantageously, utilizing the threshold enables isolation of impact events at a given time in terms of energy. That is, larger particles will likely transfer more energy to the solids detector 40. This correlation may be evaluated because the kinetic energy is equal to $(\frac{1}{2})mv^2$, where m is mass (e.g., sand grain mass) and v is velocity (e.g., grain velocity). In various embodiments, decay events after impacts may also be incorporated into the impact analysis.

In certain embodiments, the mean flow speed in the sensor spool is determined from flow measurements in the spool 78 or elsewhere in the system. Analysis of the energy transfer and associated momentum transfer may be conducted in a variety of ways. In an embodiment, the peak amplitude in a windowed time segment may be used as a proxy for the energy transfer and therefore particle size may also be inferred from a density of the particles. As described above, the peak may also be referred to as a signature. Also, the amplitude may be referred to as a characteristic. In various embodiments, most proppants may have a density ranging from 2.0-3.0 grams/cm$^3$. Because density is equal to mass divided by volume, and proppant is generally spherical, the particle size can be estimated. FIGS. 18A, 18B, and 19A-19C include impact count and particle size corresponding to the peaks identified by the detectors.

In the illustrated embodiment, the method also includes determining particle flow statistics (block 138). For example, various relationships may be also utilized to estimate mass flow rate over time or to calculate sand volume fractions. The method disclosed identifies and quantifies the mass of every sand impacting the receptor 88. The information mass may be aggregated over a period to estimate the total mass impacting the receptor 88 over that period. Knowing the impact area of the receptor 88 within the flow area, the total mass flowing through the cross-section where the solids detector 40 is located can be estimated using a table to correct for the aperture of the receptor 88.

In various embodiments, another embodiment, the computed sand grain diameters may be binned over a period to understand the particle size distribution of the produced solids. Thereafter, that distribution may be compared to a known distribution, for example, based on the distribution of the proppant previously introduced into the well at a certain fracturing stage, to determine the source of the sand flow. Fracturing operations are often conducted in various stages or wellbore zones. For example, different portions of the wellbore may receive hydraulic fracturing fluid containing proppant having different particle size distributions. Furthermore, different zones of the well may be fractured at different times and at different pressures. The statistical analysis may be further utilized to estimate sand mass flow rates over time, to calculate sand volume fractions in the flow, or determine other properties of the flow. Where the source of sand flow is ascertained, the mass flow rate may be aggregated to calculate the volume of sand produced by the fracture and volume of sand retained in the fracture. This information along with the bottom hole pressure may be used to assess reservoir connectivity with the wellbore. Moreover, the efficacy of hydraulic fracturing at certain stages may be evaluated utilizing the information gathered by the solids detector 40. For example, high sand flow rates may be indicative of proppant flowing out of the formation and not propping open fissures in the formation, as designed. Cumulative production of sand from the wellbore over a period of time along with historical time series of sand production may be used to determine the remaining fracture permeability/fracture-wellbore connectivity and expected production decline over the remaining life of the well.

In various embodiments, one or more processing devices may be adjusted, based at least in part on the flow statistics (block 140). For example, total sand flowing through the system may be used to assess the erosion of downhole completion and surface equipment, as well as predict remaining useful life of the equipment. Instantaneous or near instantaneous particulate production can cause severe erosion and safety issues in downhole and surface tools. In some cases, sand separators are permanently installed downstream of the wellhead to minimize the risk of sand erosion. An alternative embodiment would entail choking the flow at the inception of particulate in the flow stream, for example via the flow control device 22, and minimizes sand mobility. In this embodiment, the instantaneous sand flow rate may feedback to the control 44 to manage the total production from the wellhead 16 and therefore manage and stabilize particulate production from the formation and its subsequent conveyance to the surface. Such a system can enable surface sand management strategies, and minimize or eliminate downhole sand management tools. In this manner, the illustrated method may be utilized to identify, evaluate, and utilize information related to sand flow rates.

Furthermore, in various embodiments, flow in the production tubing may be automated, for example, by cycling valves based on sand detection and volume estimation. The information available from the sensor may be used to control the production of the flow for several production criteria. In one embodiment, the production may be choked to minimize or manage the amount of sand being produced, to prevent drainage of proppant sand in fractured zones or sand production from unconsolidated formations. In another embodiment, the production may be throttled to maximize hydrocarbon production while managing produced sand in the surface sand separators. In an alternative embodiment, when instantaneous sand mass flow rate exceeded specific thresholds, the system could automatically actuate a valve to either shut-in or bypass the flow to a sand separator system to manage and remove sand from the production.

In various embodiments, information may be recorded to predict or otherwise plan further events at the wellbore (block 142). For example, in various embodiments the data acquired may assist planning of a future fracturing event, or the like. Furthermore, the analytics provided regarding erosion may enable planning of downtime for maintenance, for example when new replacement equipment arrives on site. Additionally, in various embodiments, the information may be utilized to plan operations at wellbores having similar characteristics, thereby enabling more efficient operations.

Figures 7A, 7B, 7C, 7D, 7E:
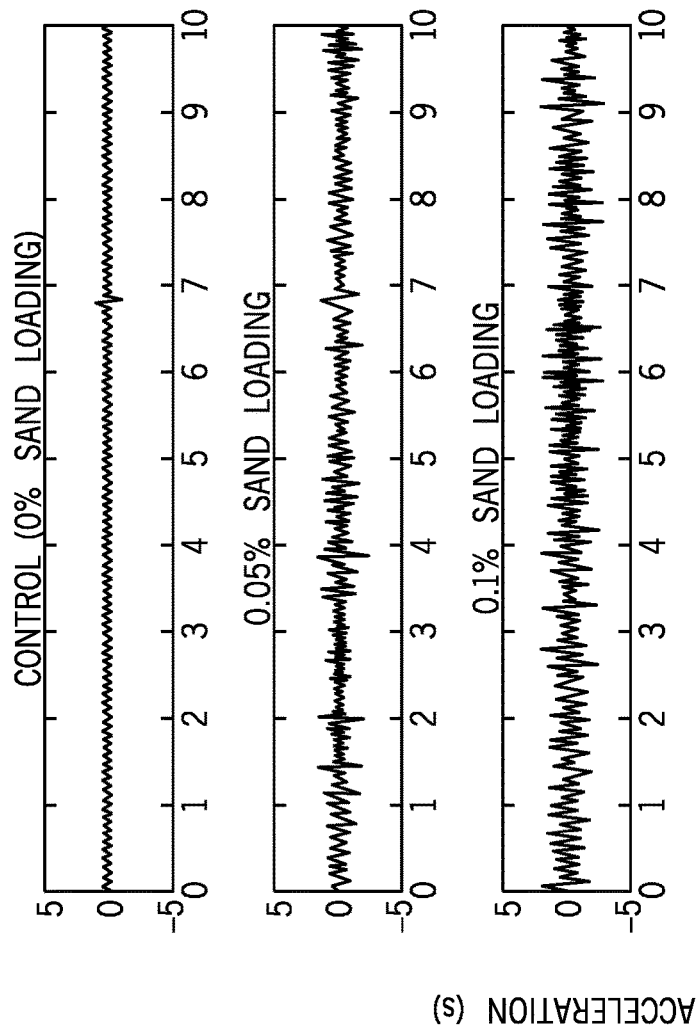
FIGS. 7A-7E are graphical representations of embodiments of sensing data, in accordance with embodiments of the present disclosure.

FIGS. 7A-7E and 8A-8E are graphical representations of various signals obtained at a variety of sand loading rates. It should be appreciated that the signals in FIGS. 6A-6E may correspond to the detector 72 and the signals in FIGS. 8A-8E correspond to the detector 74. Furthermore, the signals are for illustrative purposes only, as are the associated flow rates. In the illustrated embodiments, FIGS. 7A and 8A correspond to a zero percent sand loading. FIGS. 7B and 8B correspond to a sand loading of approximately 2.27 kg/hr (e.g., approximately 5 lbs/hr). FIGS. 7C and 8C correspond to a sand loading of approximately 4.54 kg/hr (e.g., approximately 10 lbs/hr). FIGS. 7D and 8D correspond to a sand loading of approximately 6.8 kg/hr (e.g., approximately 15 lbs/hr). FIGS. 7E and 8E correspond to a sand loading of approximately 9.07 kg/hr (e.g., approximately 20 lbs/hr). As illustrated in the embodiments, the higher sand loadings correspond to an increased signal response, e.g., more impact events. This is likely because higher sand loadings will correspond to greater quantities of sand in the flow, thereby increasing the likelihood of impact events. In the embodiments illustrated in FIGS. 7A-7E and 8A-8E, the signals may be digital signals that have been converted from analog signals. As will be described below, the signals may go through a variety of filtering, de-noising, and processing steps in order to determine various flow statistics, which may be utilized to control operations at the well site.

Figures 9A, 9B, 9C:
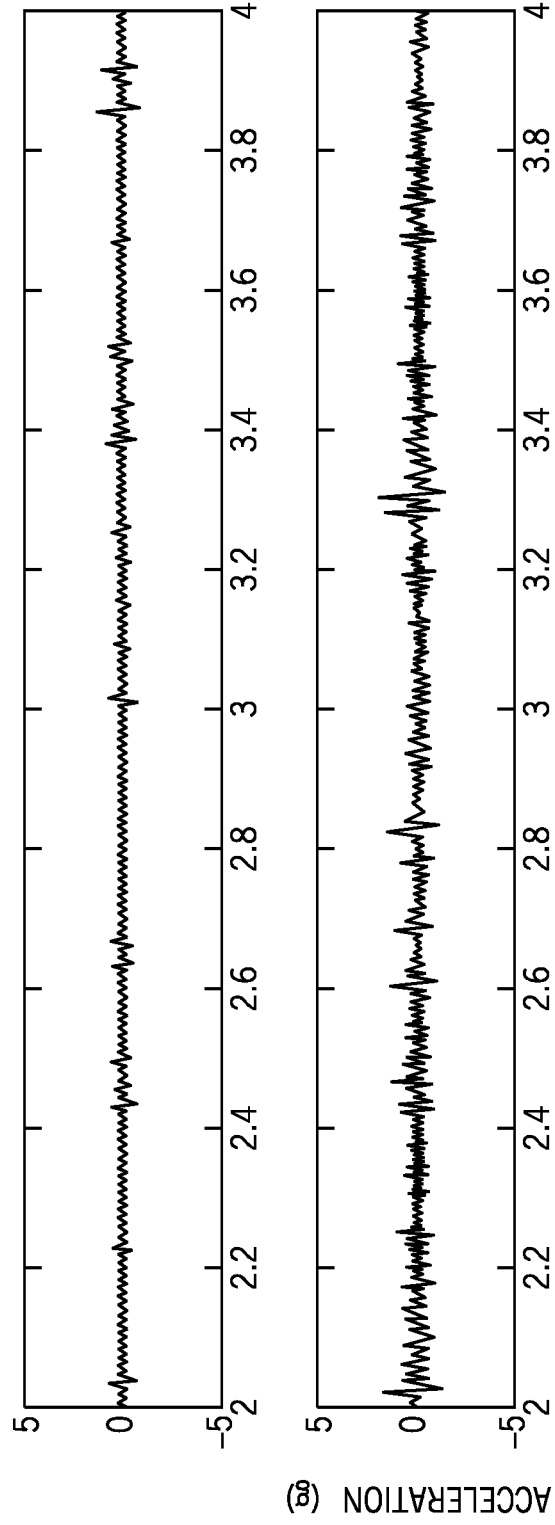
FIGS. 9A-9C are graphical representations of embodiments of filtered sensing data, in accordance with embodiments of the present disclosure.

As described above, in various embodiments raw or preprocessed signals may be passed through one or more filters such as the BP filter, wavelet filter, high pass filter or the like. For instance, as described above, the wavelet transform may have been utilized to de-noise the signal to eliminate extraneous information not related to impacts from the sand particles. It should be appreciated that the one or more filters may be particularly designed based on different applications and/or anticipated recovery conditions. FIGS. 9A-9C illustrate signals obtained from the detectors 72, 74, in this instance an accelerometer, which plots acceleration along the Y-axis and time along the X-axis. As shown, the peaks may correspond to one or more impacts on the sensing probe. When compared to the signals from FIGS. 7A-7E and 8A-8E, it is apparent that the filtering process has removed significant extraneous information, thereby enabling better identification of the peaks, which may correspond to impact events. In various embodiments, the signals from each detector 72, 74 may be overlaid, as illustrated in FIGS. 9A-9C. However, in certain embodiments different filtering processes may be applied to different signals from the different detectors 72, 74.

Figure 10:
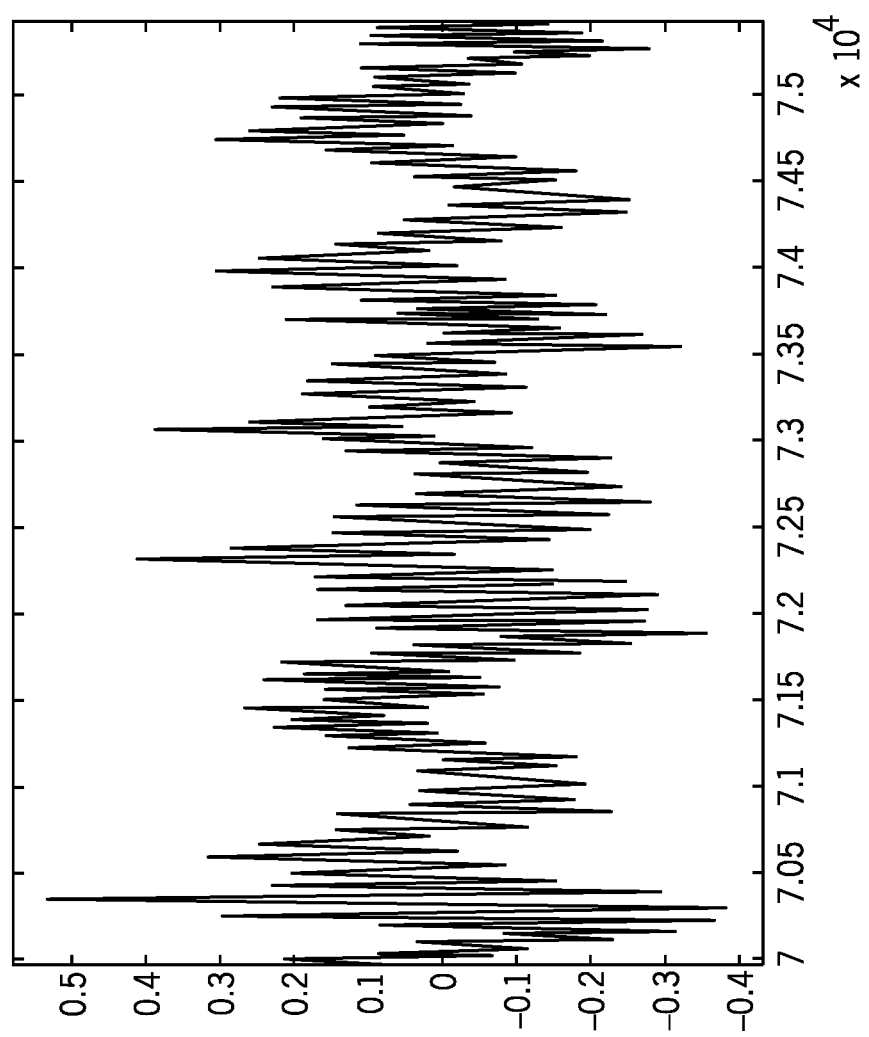
FIG. 10 is a graphical representations of an embodiment of raw sensing data, in accordance with embodiments of the present disclosure.
Figure 11:
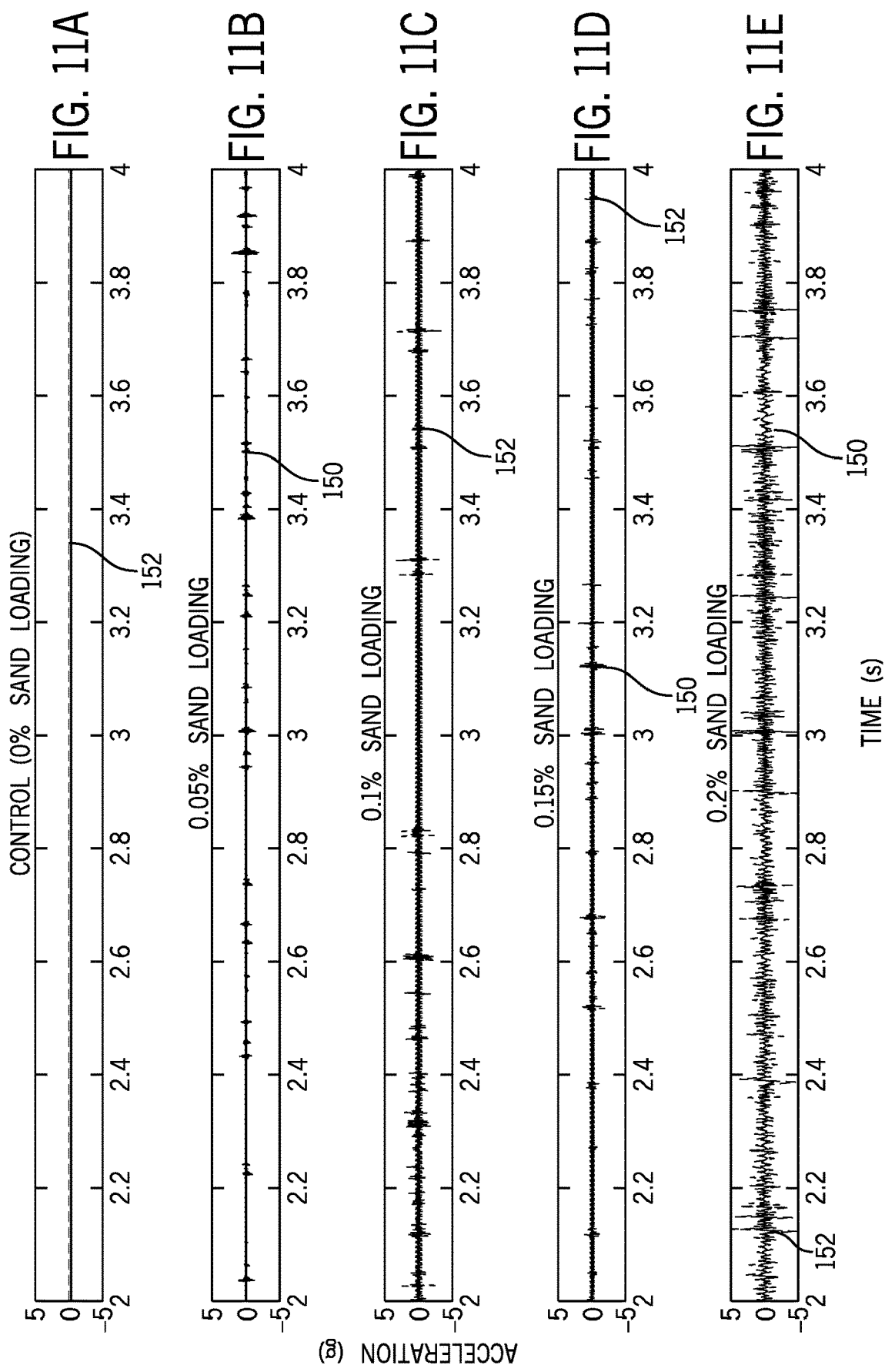
FIGS. 11A-11E are graphical representations of embodiments of de-noised signals, in accordance with embodiments of the present disclosure.

FIG. 10 is a graphical representation of raw signal. In the illustrated embodiment, the signal of FIG. 10 corresponds to a 120 Hz triangular wave noise component. That is, the signal has not been processed or de-noised. As a result, the peaks are difficult to ascertain. Such information may lead to erroneous identification of impact events, thereby reducing the applicability. Accordingly, in various embodiments, filtering and de-noising events, as described herein, may be utilized in order to identify particular peaks within the signals, which may correspond to impact events. These peaks may then further be utilized to determine properties of the fluid and/or particles therein.

FIGS. 11A-11E are graphical representations of the signals having de-noising applications applied thereto. It should be appreciated that the sand load rates described with reference to FIGS. 7A-7E correspond to the same letter in FIGS. 11A-11E. The illustrated embodiment includes the original, noisy signal 150 and the filtered signal 152 overlaid over the noisy signal 150. The filtered signal 152 appears as a lighter shade, for clarity. With noise removed, for example using one or more process described above, the filtered signals include distinct peaks for evaluation and analysis. These peaks may correspond to an impact event, which may then be related to particular particle size and/or energy.

Figure 12:
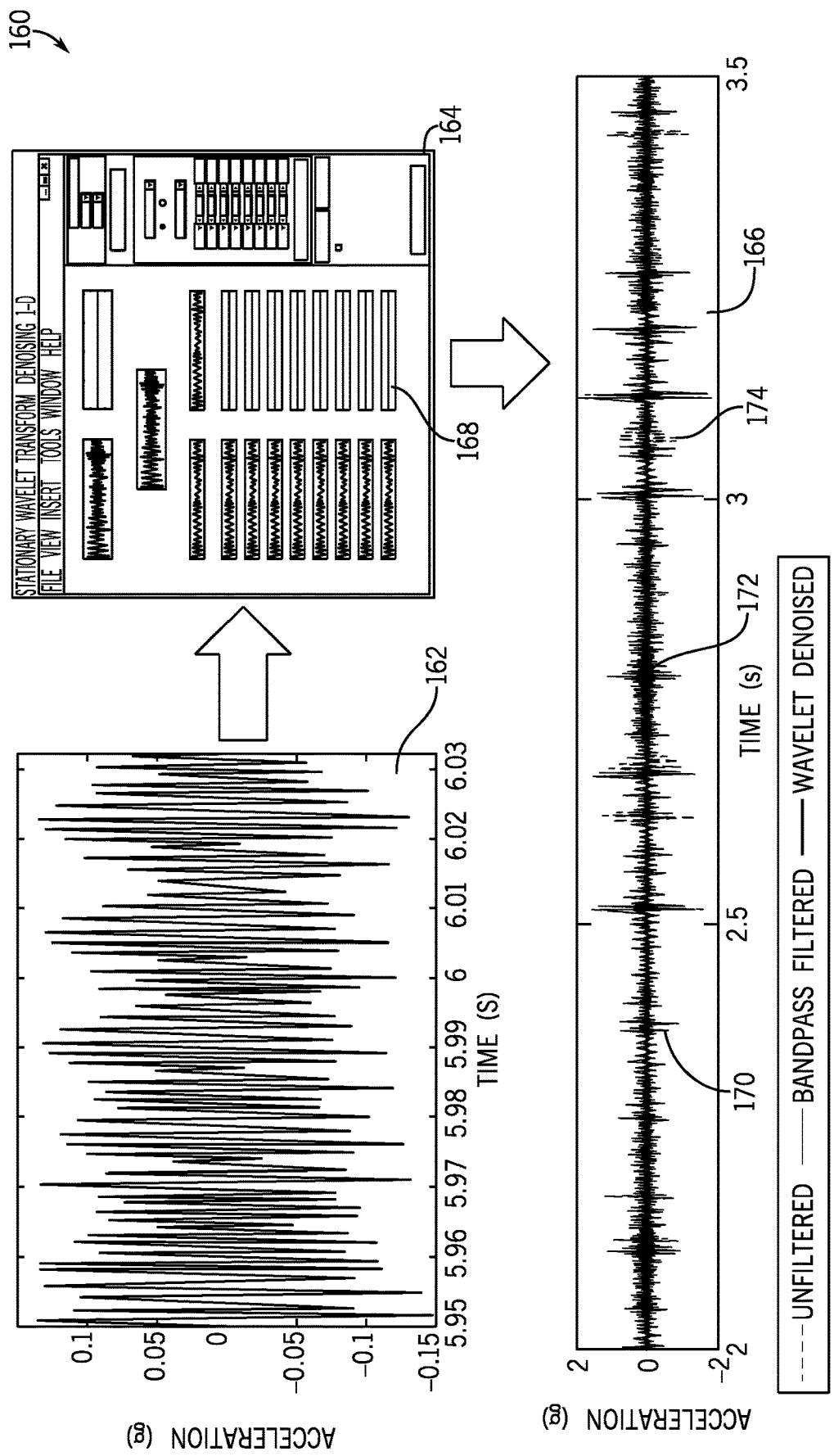
FIG. 12 is a representation of an embodiment of a filtering environment, in accordance with embodiments of the present disclosure.

FIG. 12 illustrates a de-noising environment 160 including an unfiltered signal 162, a de-noising interface 164, and a filtered signal 164. The environment 160 illustrates a flow from the raw, unfiltered signal 162, where peaks and data are difficult to deduce, to the filtered signal 164. In various embodiments, the unfiltered signal 162 is obtained by the solids detector 40, for example the detectors 72, 74. In various embodiments, the de-noising interface 164 includes a variety of wavelet coefficients 168, which may be applied to determine a preferred waveform of interest. In various embodiments, the wavelet coefficients 168 correspond to wavelet filters that looks at specific characteristics to reduce and/or eliminate noise and to isolate a specific wavelength. In the illustrated embodiment, longer wavelets may be desirable to reduce the likelihood of identification of noise. That is, identification of events with an initial signal jump followed by an oscillatory decay may be desired to identify impacts of sand particles as opposed to a single jump event followed by very short or no decay, which may correspond to noise, such as vibration at the well site. As such, the wavelet filter illustrated in FIG. 12 may evaluate the signal for a specific characteristic and apply the wavelet transform to identify the potential impact event from the signal. Accordingly, FIG. 12 represents processing steps to both reduce noise and to identify impacts.

Upon application of the wavelet coefficients 168, the filtered signal 166 is provided. The illustrated embodiment, for clarity and illustrative purposes, includes an unfiltered signal 170 positioned below a bandpass filter signal 172 and the wavelet de-noised signal 174. The different signals 170, 172, and 174 are represented by different shading. In the illustrated embodiment, the wavelet de-noised signal 174 includes more distinct peaks than either the unfiltered signal 170 or the bandpass filter signal 172. Accordingly, applying the wavelet coefficients 168 enables further de-noising of the raw signal, thereby providing improved identification of potential impact events. In various embodiments, the wavelet coefficients 168 may correspond to an additional filtering event. However, in embodiments, the wavelet coefficients 168 may be incorporated into a single filtering step.

Figure 13D:
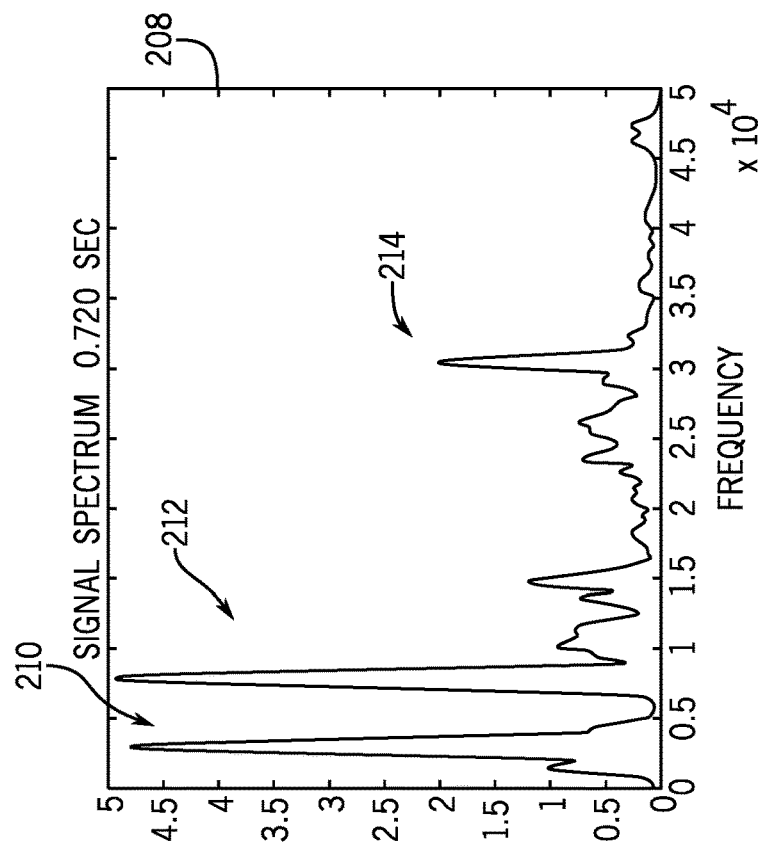

FIGS. 13A-13D are graphical representations of an embodiment of a reference signature filter, which may be utilized with embodiments of the present disclosure. In various embodiments, the reference signature filter may be applied over a wavelet to identify frequency responses over particular periods of time. By selecting the periods of time to correspond to a signature (e.g., peak), the build-up and decay of the peak may be viewed. As described above, the decay of the peak is indicative of an impact event, as opposed to a spike and then no decay, which may represent noise, such as vibration, at the wellsite. Furthermore, as described above, in various embodiments the peak may also be referred to as a signature. FIG. 13A illustrates a reference signal 180 taken over a period of time, which is approximately 0.03 seconds in the illustrated embodiment. As shown, the reference signal includes noise and is difficult to identify various peaks (e.g., signatures) clearly, thereby obscuring potential impact events. What may be recognized, however, within the reference signal 180 is a first peak 182 at approximately 0.705 seconds. The first peak 182 may be identified by the decay 184 that follows the first peak 182. Additionally, a second peak 186 may be identified at approximately 0.720 seconds, as also identified by the decay 188. Furthermore, between the first and second peaks 182, 186 is a lower region 190 than the peaks, which may also be evaluated.

Figure 13C:
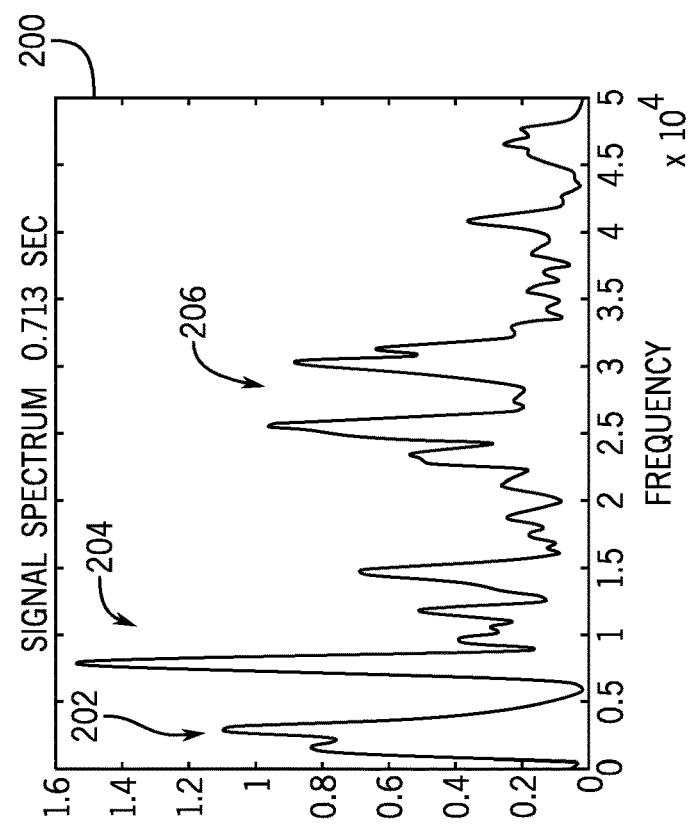

FIG. 13B represents a spectrum 192 at the 0.705 second mark that includes indicative peaks 194, 196, 198 at 7.5, 10.5, and 25 kHz. Similarly, FIG. 13C represents a spectrum 200 at the 0.713 second mark that includes indicative peaks 202, 204, 206 at 2.5, 7.5, and 25 kHz. However, when compared to the spectrum 192, the indicative peaks 202, 204, 206 are at a lower level. FIG. 13D represents a spectrum 208 at the 0.720 that includes indicative peaks 210, 212, 214 at 2.5, 7.5, and 30 kHz. Moreover, the peaks 210, 212 are much higher than the other 2.5 and 7.5 kHz peaks of FIGS. 13B and 13C. In an embodiment of the current disclosure, such frequency-time characteristics may be used to identify and classify particle impacts and to quantify their parameters. In an embodiment, the original signal may be passed through a filter bank to separate into two or more frequency bands, each comprising one or more of the frequency peaks such as shown in FIGS. 13B-13D. One or more of the previously described processing steps such as de-noising, enveloping, peak detection and correlation is applied to each of the frequency bands. The particle impacts are characterized by the parameters determined from each frequency band signal, enabling more accurate classification of particle impacts.

FIGS. 14A-14D are graphical representations of de-noising operations from both of the detectors 72, 74 overlaid for clarity. In the illustrated embodiment, the detector 72 is represented by a darker color than the detector 74. Overlaying the signals after de-noising may facilitate detection of peaks, which may correspond to impact events, and removal of noise or other anomalous signals. For example, in various embodiments the two detectors 72, 74 are coupled to ends of the receptor 88. As the particles 80 strike the receptors 88, the energy, and responsive signal, travels to each of the detectors 72, 74 at approximately the same time. Even if the particle 80 does not strike the receptor 88 at the center, the length may be short enough such that the signals still reach the detectors 72, 74 at approximately the same time. As a result, the signals should be substantially aligned. A peak or event identified by only one of the detectors 72, 74 may be indicative of external vibrations or the like, which may be correlated to noise, and not to impact events.

FIGS. 14A-14D illustrate substantial alignment of a majority of the signal, with some outliers for noise. While there is general alignment between the signals, there are instances where one detector records an event and the other does not. In embodiments, a difference may be indicative of a noise event and further processing, such as multiplying the signals, may be utilized to identify peaks that are substantially recorded by both detectors. Signals identified by both detectors have a higher likelihood of being impact events than signals identified by only a single detector. Furthermore, multiplication of the signals will enhance peaks that align by smoothing out misaligned peaks. In this manner, impact events corresponding to the peaks may be readily separated from noise.

Figure 15A:
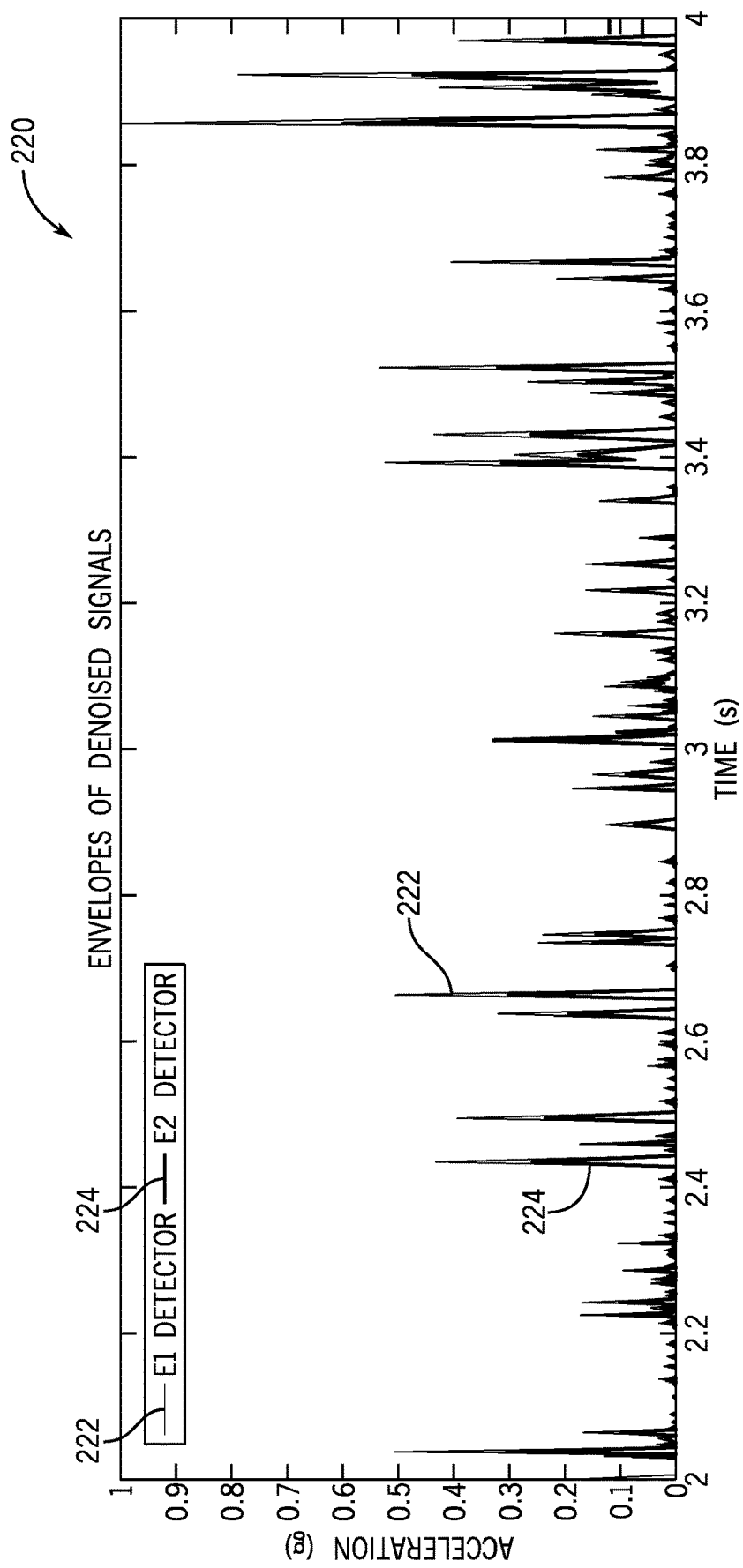
FIG. 15A is a graphical representation of an embodiment of filtered data, in accordance with embodiments of the present disclosure.

FIG. 15A is a graphical representation of enveloping a de-noised signal 220. As used herein, an envelope refers to a smooth curve outlining the extremes of an oscillating signal. Accordingly, the envelope may be utilized to generalize the concept of a constant amplitude. In other words, the envelope is utilized to smooth out curves and help identify peaks, but as described below may be indicative of an impact event based on exceeding a threshold and/or being a certain threshold larger than surrounding values. In the illustrated embodiment, the de-noised signal 220 includes overlaid data from the detectors 72, 74, represented by the spectra 222 and 224, respectively. In various embodiments, the spectra 222, 224 will substantially align, as described above, thereby providing an indication of an impact event rather than localized noise for one or more of the detectors 72, 74. However, in embodiments, signals from one of the detectors 72, 74 may be larger than the other. For example, if the particle 80 contacts the receptor 88 closer to the detector 72 than the detector 74, the detector 72 may experience a larger force, thereby providing a higher amplitude peak. However, the substantial alignment of the signals still provides the decay after the peak, which as described above may correlate to an impact event. In various embodiments, the enveloping may smooth out the amplitudes to provide an indication as to the location of the peaks, which may be utilized later for targeted, specific data analysis.

Figure 15B:
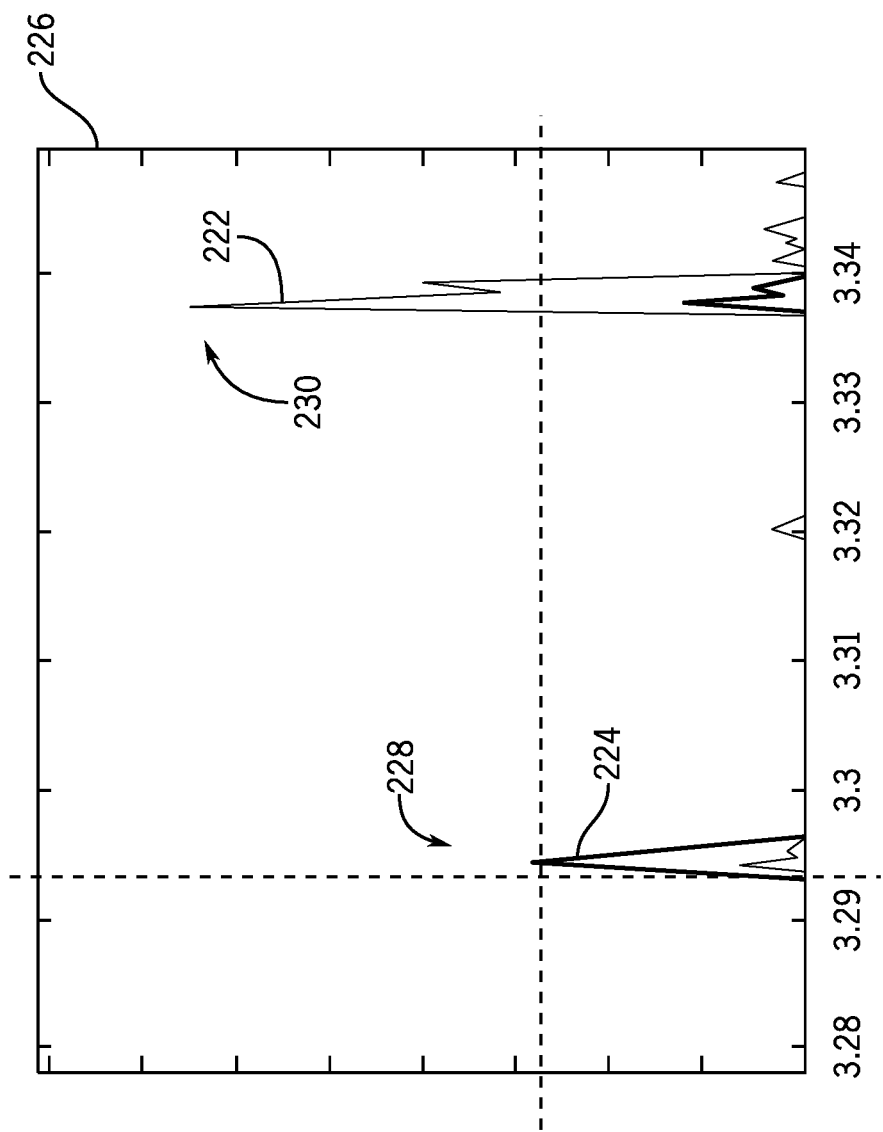
FIG. 15B is a graphical representation of an embodiment of a de-noised envelope of data, in accordance with embodiments of the present disclosure.

FIG. 15B is a graphical representation of a targeted envelope section 226 over the time period 3.28 to approximately 3.34. In the illustrated embodiment, the spectra 222, 224 are substantially aligned. However, a first peak 228 at approximately 3.29 seconds is substantially larger in the second spectrum 224 than the first spectrum 222. Additionally, a second peak 230 at approximately 3.34 seconds is substantially larger in the first spectrum 222 than the second spectrum 224. However, the general alignment of the spectra 222, 224 enables identification of the first and second peaks 228, 230 within the envelope section 226. As will be described below, further processing may be utilized to determine whether the differences in respective peak amplitudes are the result of noise or the position where the solid particles 80 struck the receptor 88. For example in various embodiments, the signals may be multiplied together and compared against a threshold. If the amplitude of the peak exceeds the threshold, the peak may be indicative of an impact event. If the amplitude does not, the peak may be indicative of noise. In this manner, alignment of the peaks may be further evaluated to determine noise events compared to impact events.

FIGS. 16A-16D are graphical representations of various signals acquired by multiplying the signals from the first detector 72 with the second detector 74. As described above, in various embodiments multiplying the signals together may be utilized to smooth out potential noise events, which may correspond to a peak recorded with regard to one detector but not to another detector. Furthermore, peaks that are substantially aligned will be amplified, thereby providing a greater distinction between a legitimate peak that corresponds to an impact event, rather than a peak that may be indicative of noise experienced by one of the detectors 72, 74. The signals illustrated in FIGS. 16A-16C include sand loading similar to the loading described above. As illustrated, distinct peaks are presented at various intervals after multiplication of the signals. When compared to the signals represented in FIGS. 14A-D, for example, it is apparent that signals that have significant overlap/alignment are larger than the signals that are not aligned. Accordingly, the remaining peaks may be indicative of impact events, while the reduced height of misaligned peaks may be indicative of noise. As will be described below, by applying a threshold amplitude, impact events may be recorded at various times. The threshold may correspond to experimental data and/or be representative of a percentage viewed over a period of time.

Figure 16A:
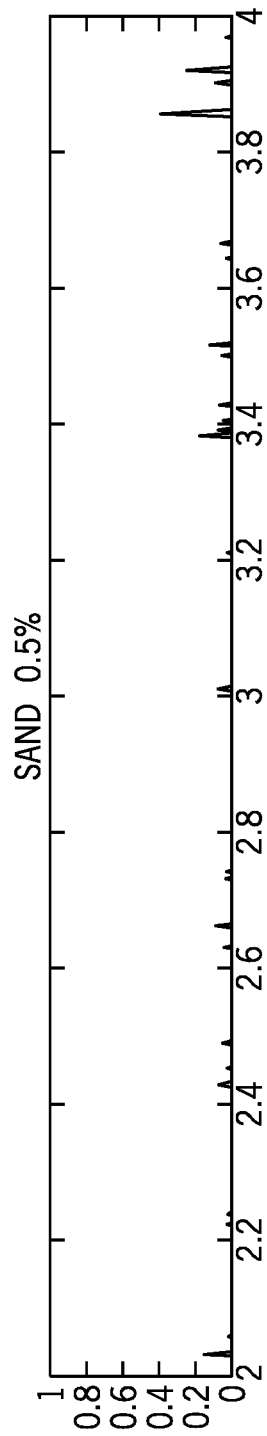
FIGS. 16A-16D are graphical representations of embodiments of combined data signals, in accordance with embodiments of the present disclosure.
Figure 16B:
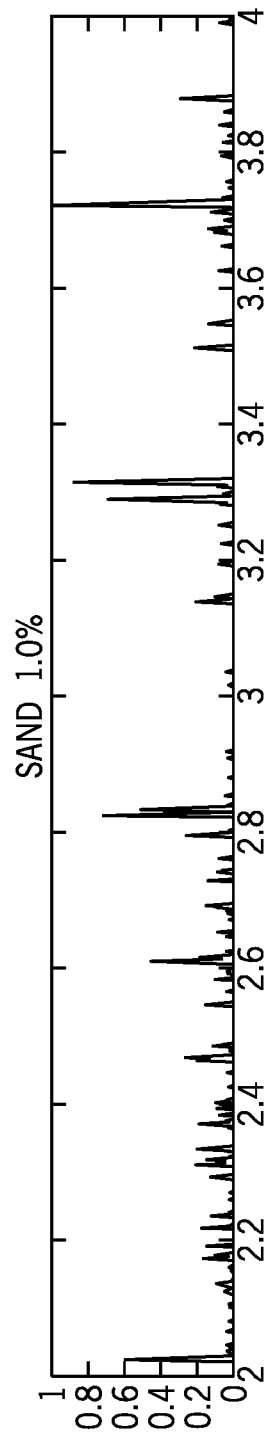
Figure 16C:
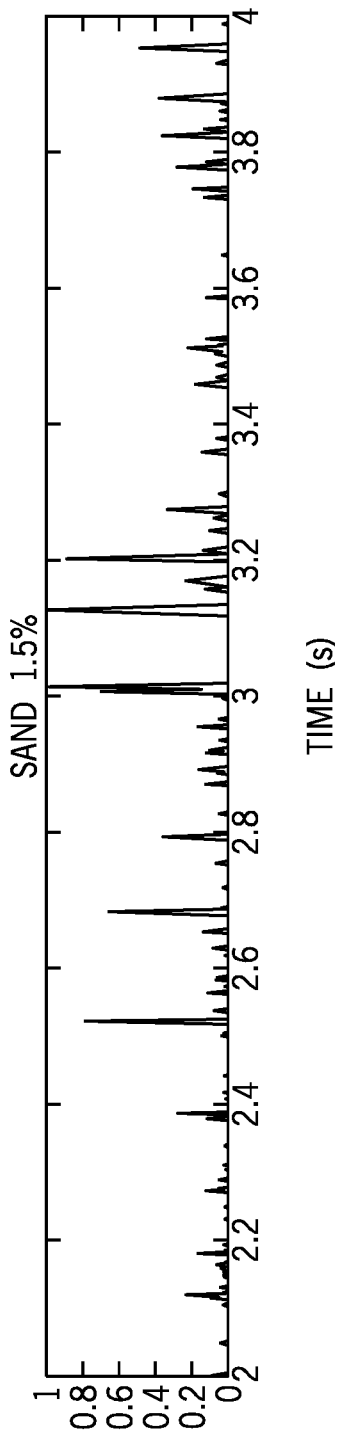
Figure 16D:
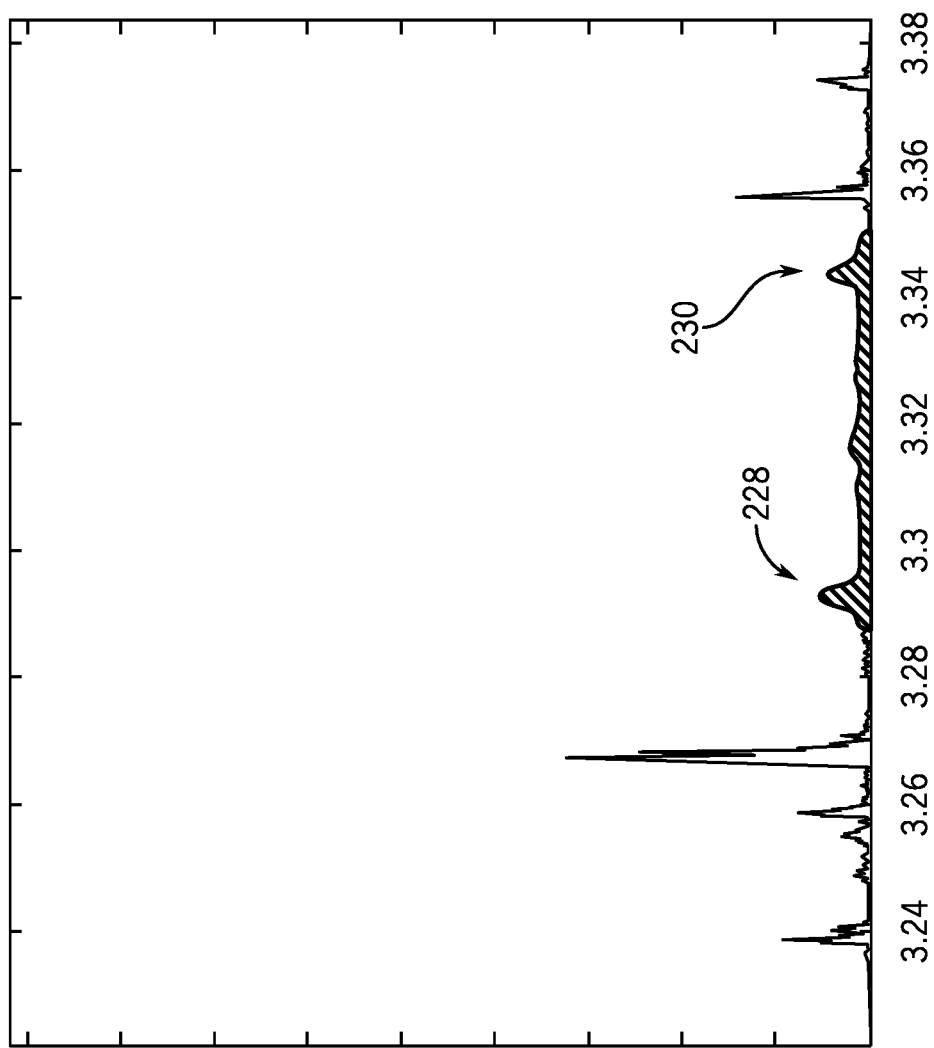

FIG. 16D is an extracted portion of FIG. 16C that corresponds to the time interval of approximately 3.24 second to 3.38 seconds. This interval is similar to the interval illustrated in FIG. 15B. As noted above, in FIG. 15B there was misalignment between the first peak 228 and the second peak 230 with regard to the first spectrum 222 and the second spectrum 224. That is, the first peak 228 is more distinct in the second spectrum 224 and the second peak 230 is more distinct in the first spectrum 222. Multiplying these signals together, however, smoothes out the differences. As illustrated in FIG. 16D, the first peak 228 is reduced, as is the second peak 230. In various embodiments, these peaks 228, 230 may be reduced to the point that they below the threshold indicative of an impact event. As illustrated, surrounding peaks, which may correspond to alignment between the signals from the detectors, are larger than the first and second peaks 228, 230. Accordingly, misaligned or time-shifted signals may be smoothed out, and in various embodiments, disregarded as potential impact events.

Figure 17:
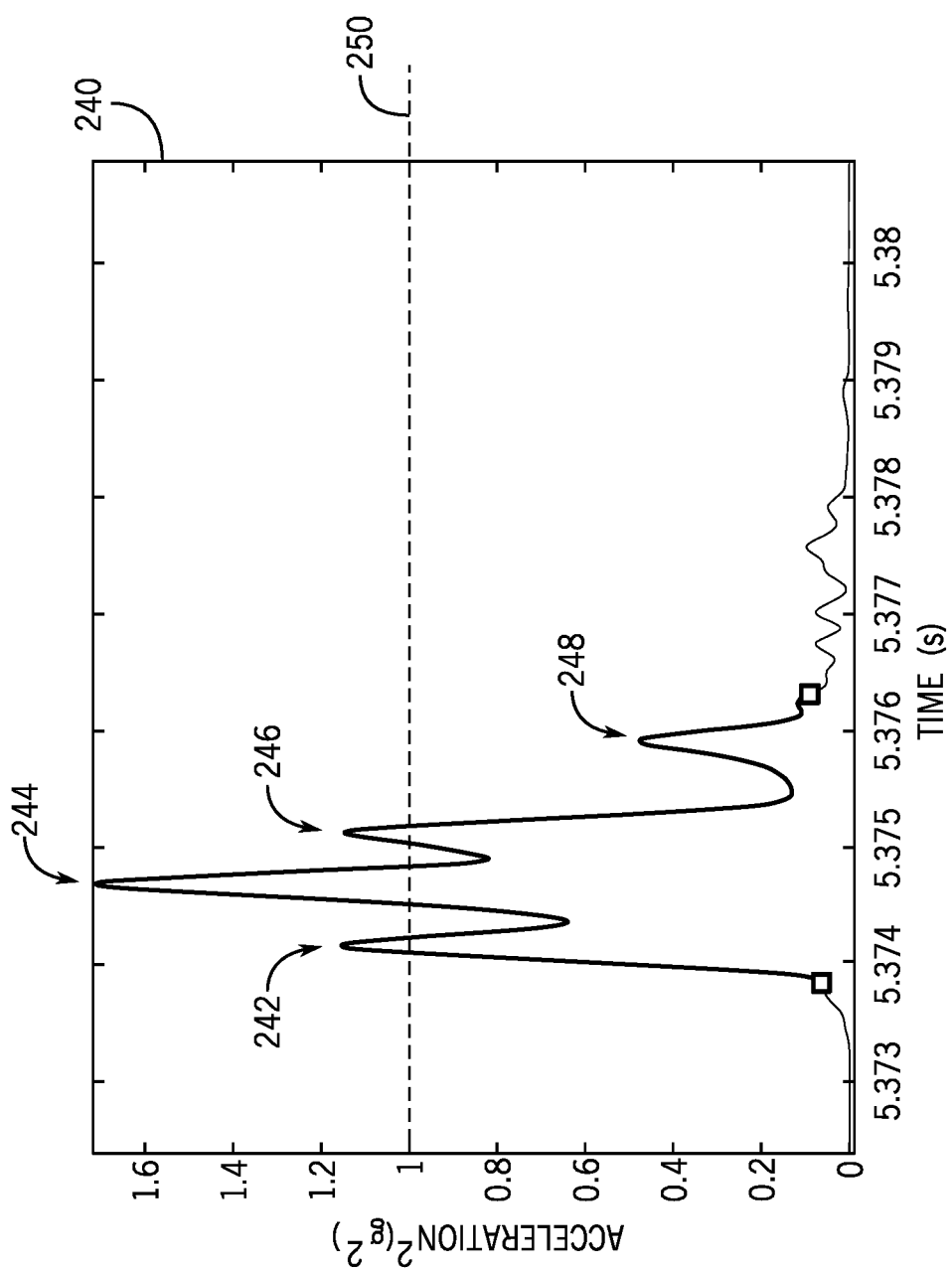
FIG. 17 is a graphical representation of an embodiment of a peak identification, in accordance with embodiments of the present disclosure.

FIG. 17 is a graphical representation of a peak detection over a period of time. The illustrated embodiment includes a spectrum 240 having a plurality of peaks 242, 244, 246, and 248. In various embodiments, the peaks 242, 244, 246, 248 are identified at least in part by the respective decays following the peak amplitudes. For example, as described above, in various embodiments the lack of decay may be indicative of a constant noise signal, such as from vibration or the like. In various embodiments, the amplitude may be evaluated against a threshold 250, which is set at 1 in the illustrated embodiment by way of example only. As illustrated, only the peaks 242, 244, and 246 extend above the threshold 250. However, the peak 248 is below the threshold 250, and therefore may be disregarded as noise. As described above, it should be appreciated that, in various embodiments, characteristics other than amplitude may be evaluated against one or more thresholds.

Advantageously, utilizing the threshold 250 enables isolation of impact events at a given time in terms of energy. That is, larger particles will likely transfer more energy to the solids detector 40. Particle mass may be calculated from the impact energy, using the fluid flow speed in the spool 78 housing the detector. The fluid speed may be measured at the spool or inferred using methodologies well known to those versed in the art from flow rate measurements or estimations upstream or downstream from the detector, for example via the flow meter 42 or other sensors arranged within the system. This correlation may be evaluated because the kinetic energy is equal to $(½)mv^2$, where m is mass (e.g., sand gain mass) and v is velocity (e.g., grain velocity). Furthermore, particle size may also be inferred, for example by correlating the energy to anticipated densities of the particles. In various embodiments, fracking proppant may have a density equal to approximately 2.2-3.0 grams/cm$^3$. Because density is equal to mass divided by volume, and proppant is generally spherical, the particle size can be determined.

Figure 18A:
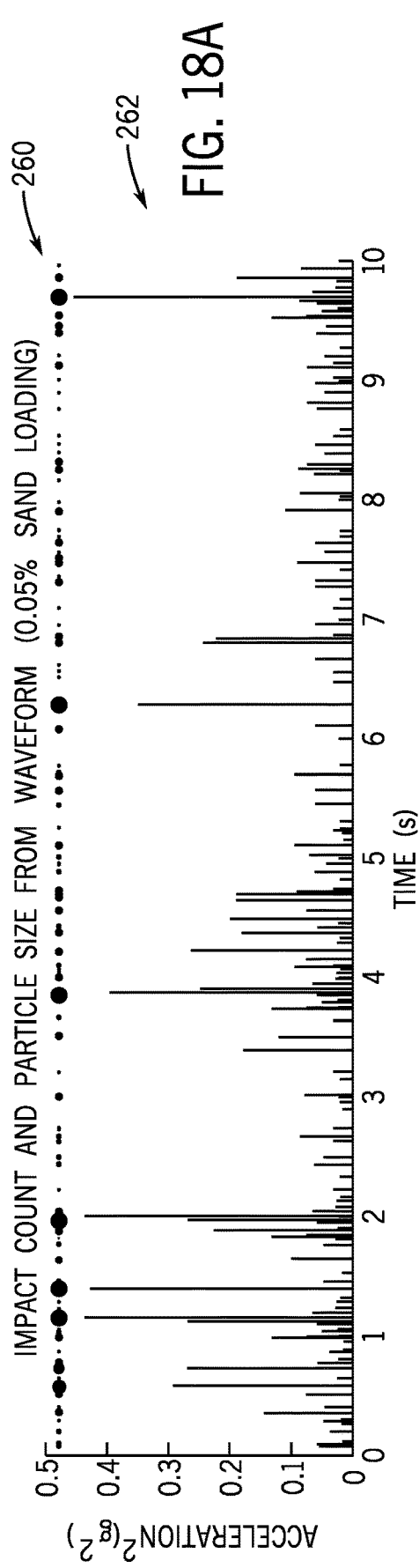
FIGS. 18A and 18B are graphical representations of embodiments of peak identification and particle size data, in accordance with embodiments of the present disclosure.
Figure 18B:
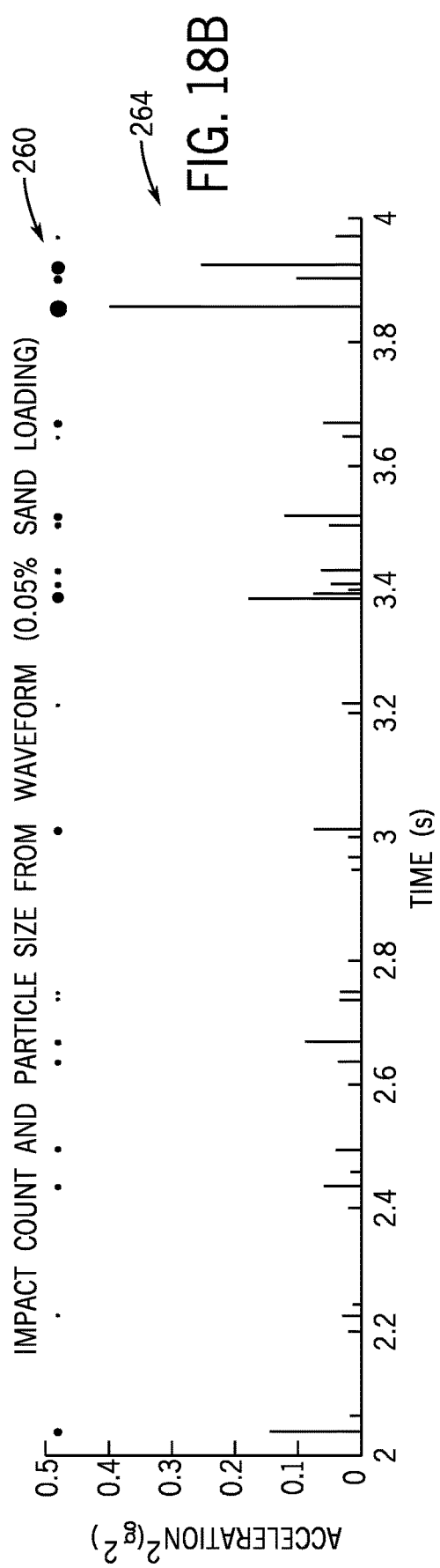

FIGS. 18A and 18B are graphical representations of impact events and associated particle sizes, which may be determined based at least in part on the amplitude of the impact events, which corresponds to acceleration in the illustrated embodiments. In the illustrated embodiment, particle size data 260 is substantially aligned with the spectra 262, 264. In various embodiments, the particle size data 260 includes variable diameter particles, which correspond to the amplitude of the peaks of the associated spectra 262, 264. That is, larger peaks correspond to larger particles, as described above. Furthermore, in various embodiments, the relationships of the impacts and associated particle size estimates may also be utilized to estimate mass flow rate over time or to calculate sand volume fractions.

Figure 19A:
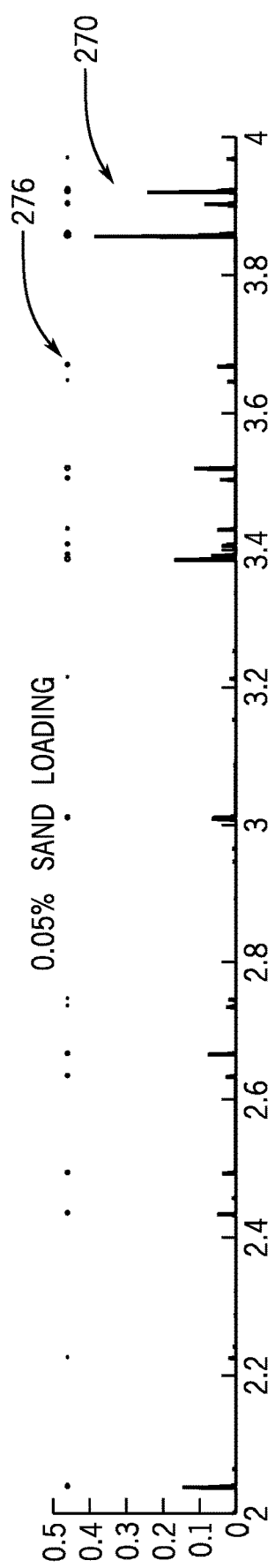
FIGS. 19A-19C are graphical representations of embodiments of peak identification and particle size data, in accordance with embodiments of the present disclosure.
Figure 19B:
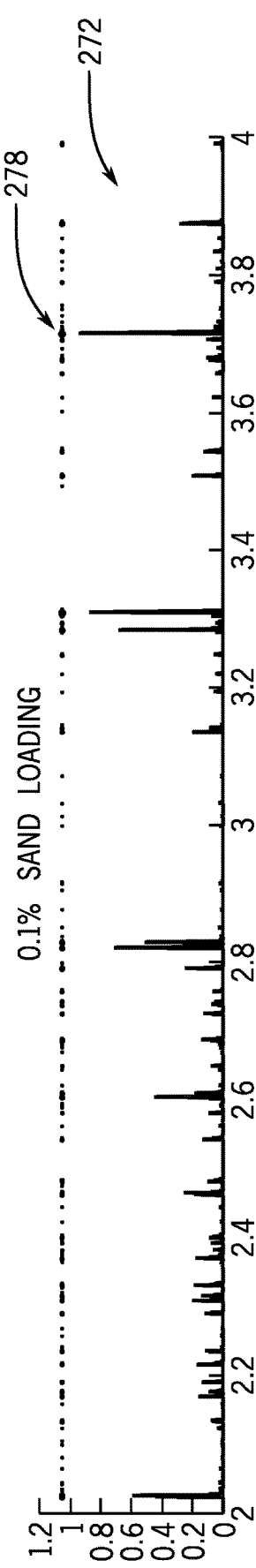
Figure 19C:
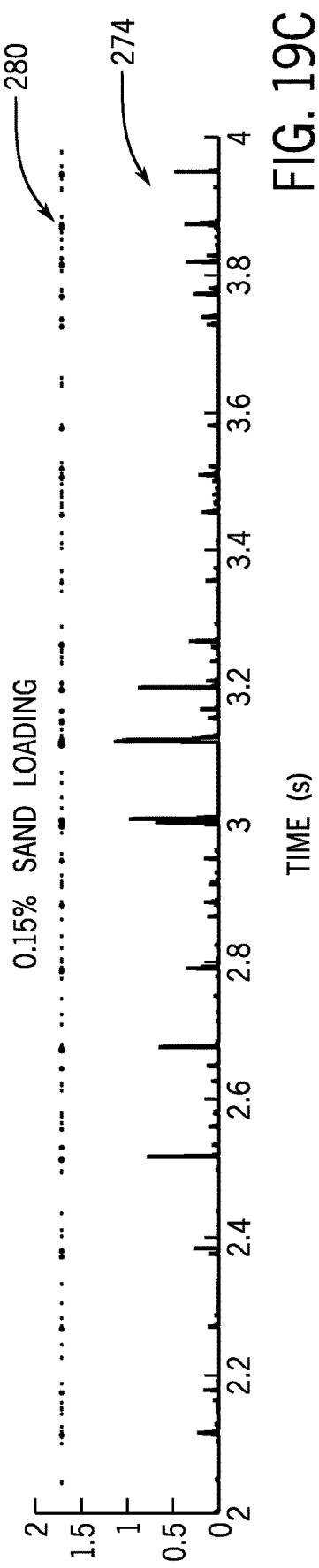

FIGS. 19A-19C are graphical representations of spectra corresponding to various sand loadings and their associated particle size data. FIGS. 20A-20C are graphical representations of particle distributions for the spectra illustrated in FIGS. 19A-19C. As described above, the respective spectra 270, 272, 274 include corresponding particle size data 276, 278, 280. The size data 276, 278, 280 may be determined, at least in part, on the amplitude of the peaks identified within the spectra 270, 272, 274. For example, larger amplitudes may correspond to larger particles. Over a period of time, the various impact events may be recorded with the associated particle sizes to develop the distributions illustrated in FIGS. 20A-20C. In the illustrated embodiments, the distributions may be utilized to determine, for example, various stages from the fracturing operations that may be traveling out of the formation and into the recovered fluid. For example, in various embodiments, fracturing occurs in stages such that different sized particles are injected into the formation at different times. Accordingly, monitoring the particle size distribution may provide information indicative of the success of the fracturing operation. As such, operators may distinguish between fracturing proppant and formation sand or fines flowing out of the well and determine which stage may be a candidate for reworking.

Figure 21:
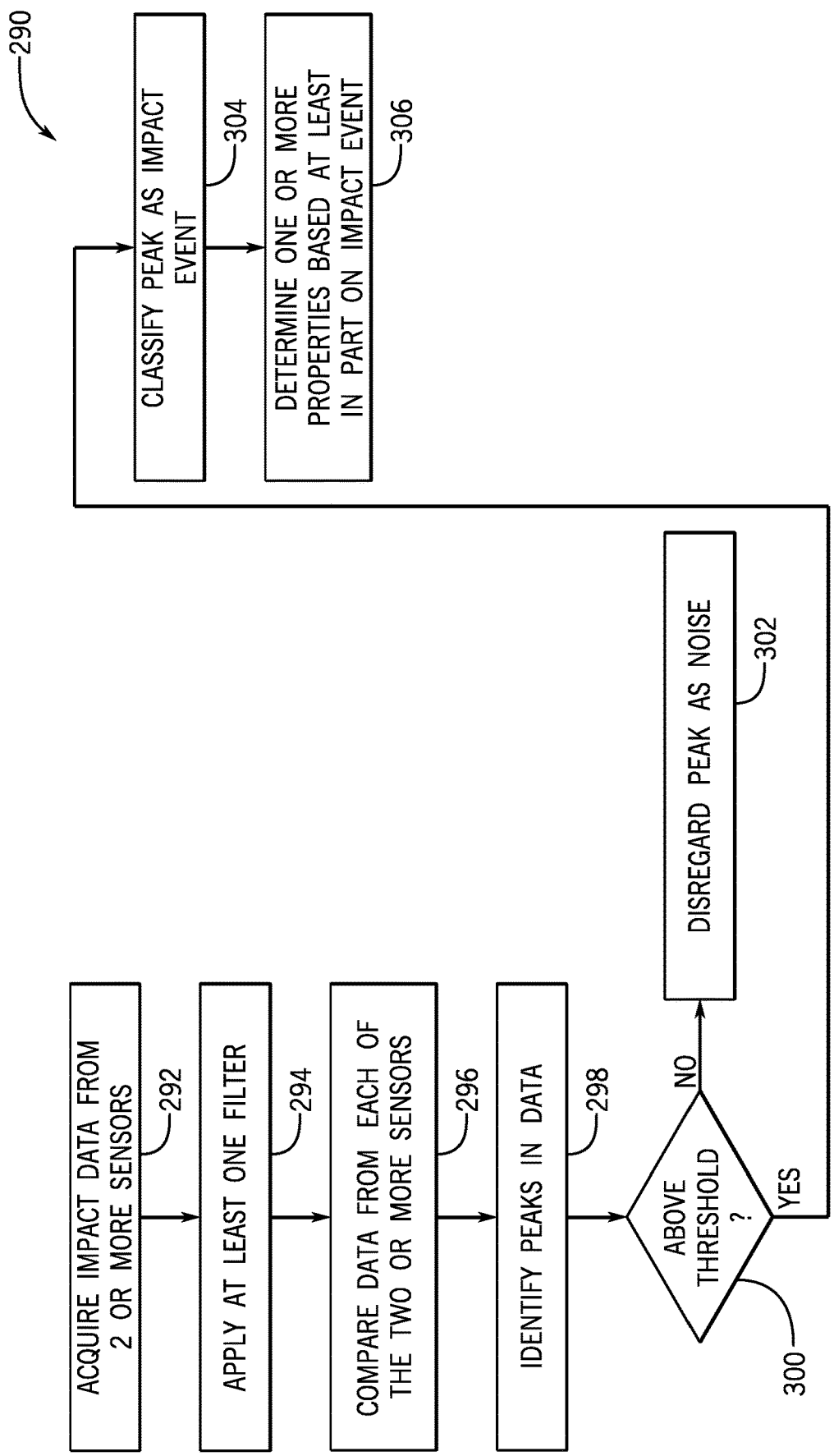
FIG. 21 is a flow chart of an embodiment of a method for determining fluidic properties based on impact events, in accordance with embodiments of the present disclosure.

FIG. 21 is a flow chart of a method 290 for determining one or more fluidic properties based at least in part on impact events recorded within a flow stream. In this example, data is acquired from two or more sensors (block 292), such as the detectors 72, 74 and/or the sensors 98, 110. In various embodiments, the data may be related to impact events that correspond to amplitude over a period of time, such as data obtained via an accelerometer. In certain embodiments, the two or more sensors are both arranged along the receptor 88. However, in other embodiments, the two or more sensors may be arranged within independent detectors 40. The data may be filtered (block 294). Filtering may include BP filtering, HP filtering, wavelet filtering, or the like. The filtering may be related to removing noise from the acquired signal, which may correspond to amplitudes in the data that are not related to impact events. It should be appreciated that a variety of filters, and also more than one filter, may be applied to the acquired data to reduce the noise. Data from the two or more sensors may be compared (block 296). In various embodiments, the comparison may relate to identifying corresponding peaks in the data, which may correspond to visible peaks at approximately a same time. As described above, corresponding peaks may be indicative of impact events while non-corresponding peaks may be indicative of individual noise events.

In certain embodiments, signatures (e.g., peaks) within the data are identified (block 298). The identification of peaks may be related to characteristics, such as amplitude, of the peaks compared to surrounding amplitudes, for example, the peak may include a spike followed by a decay. The identified peaks may be evaluated against a threshold (block 300). For example, the threshold may be related to a threshold amplitude where peaks that have an amplitude above the threshold are identified as impact events and peaks having thresholds below the threshold may be identified as noise. In various embodiments, the threshold may be predetermined, for example based on experimental data. However, in other embodiments, the threshold may be dynamic and determined based on a calculation or evaluation of the acquired data. For example, a peak having amplitude greater than 50% of the other peaks may be classified as being above the threshold. If the peak is not above the threshold, then the peak is classified as noise and disregarded (block 302). If the peak is above the threshold, then the peak is classified as an impact event (block 304). Impact events may then be utilized to determine one or more properties of the fluid flow (block 306). For example, as described above, a size of the particles may be determined based at least in part on the classification of the impact events. Moreover, a distribution within the flow may be determined. Additionally, in various embodiments, an anticipated erosion of sand flow rate may be determined based on the classification of the impact event. Accordingly, information from the sensors may be utilized to determine properties of the fluid flow based on recorded impact events.

Figure 22:
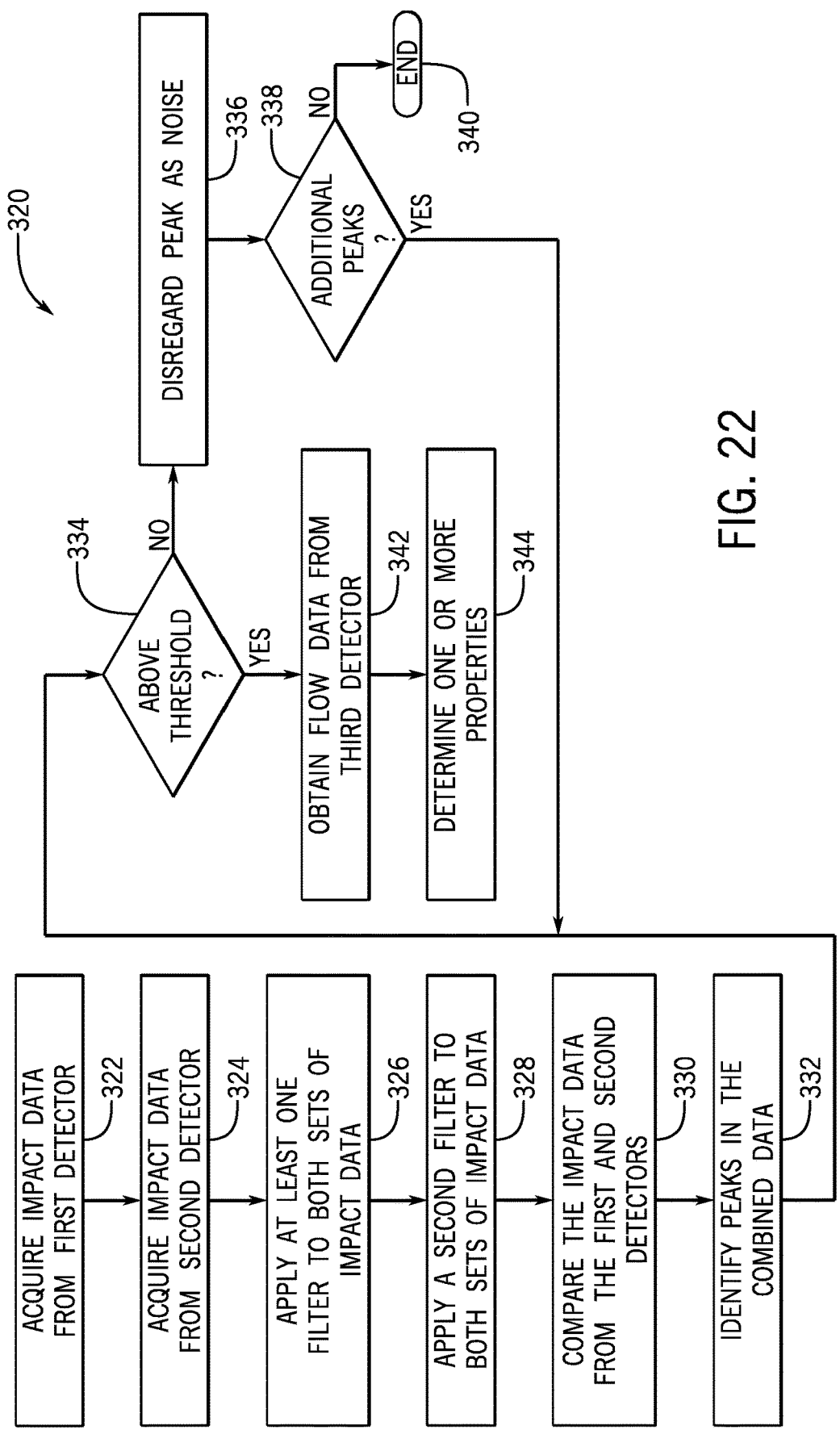
FIG. 22 is a flow chart of an embodiment of a method for determining fluidic properties based on impact events, in accordance with embodiments of the present disclosure.

FIG. 22 is a flow chart of an embodiment of a method 320 for determining fluid properties based one or more identified impact events. In this example, data, such as a spectrum, is obtained from a first detector (block 322). As described above, the data may correspond to amplitude data corresponding to impacts obtained from the solids detector 40. Second impact data may also be acquired from a second detector (block 324). In various embodiments, the first and second detectors may be incorporated into the same solids detector 40. However, in other embodiments, the first and second detectors may be arranged at different locations. A filtering operation may be applied to the data (block 326), as described in detail above. A variety of filtering operations may be applied in order to reduce noise in the signal. Additionally, in various embodiments, a second filtering operation may be applied (block 328). It should be appreciated that the filtering operations may be applied to both sets of data or to one set of data. Furthermore, in various embodiments, different filtering operations may be applied with different filtering criteria.

In various embodiments, the impact data from the first and second detectors are compared (block 330). For example, different peak locations between the first and second detectors may be compared. In various embodiments, the peak locations are compared based on a time when the signal was received. Peaks may then be identified in the combined data (block 332). For example, the peaks may be identified based on the spike and then subsequent decay, as described above. The peaks may be analyzed against a threshold (block 334). If the peak does not exceed the threshold, the peak may be discarded as noise (block 336). Thereafter, the presence of additional peaks may be determined (block 338). If additional peaks are present, then processing may continue. If not, the process may end (block 340). If the peaks do exceed the threshold, then flow data may be obtained from a third detector (block 342). For example, the third detector may correspond to the flow meter 42 or the like, which may provide additional information that may be utilized to determine one or more properties of the flow (block 344). For example, in various embodiments, the sand loading, particle size, particle size distribution, or the like may be determined. Moreover, in various embodiments, future events may be predicted based on the information, such as erosion rates or the like.

Figure 23:
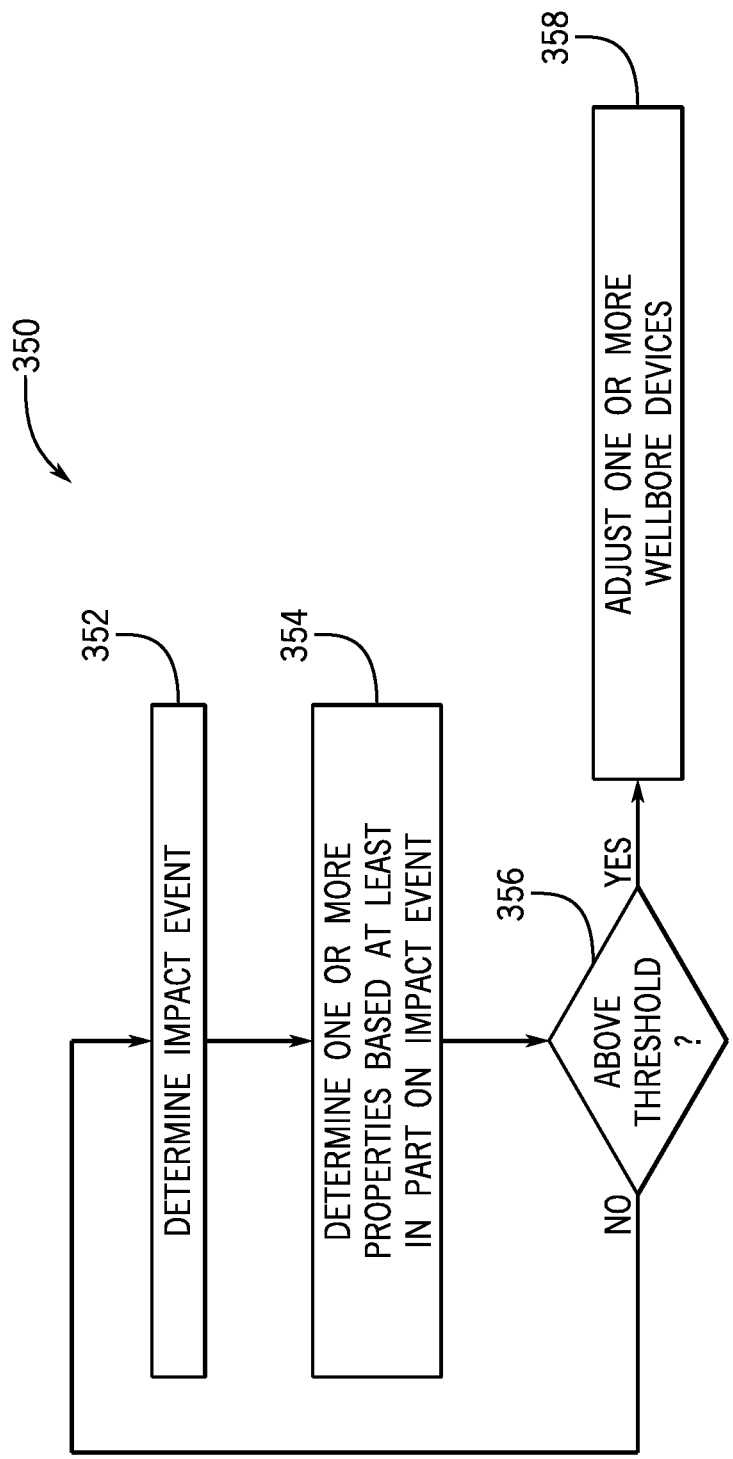
FIG. 23 is a flow chart of an embodiment of a method for adjusting wellbore operations based on impact events, in accordance with embodiments of the present disclosure.

FIG. 23 is a flow chart of an embodiment of a method 350 for adjusting one or more wellbore operations based at least in part on determined impact events. In this example, an impact event is determined (block 352). Determination of the impact event may be based on a comparison between detectors and an analysis against a threshold, as described in detail above. One or more fluid properties may be determined based at least in part on the impact event (block 354). For example, as described above, in various embodiments, sand loading or the like may be determined. Thereafter, the determined property may be evaluated against a threshold (block 356). For example, the sand loading may be compared against a threshold or a predicted erosion rate may be evaluated. If the property is greater than the threshold, an adjustment may be performed (block 358). The adjustment may be performed to one or more pieces of wellbore equipment, as described above. For example, a flow rate may be adjusted, a pumping pressure, wellbore pressure, or the like. In this manner, information from the solids detector 40 may be utilized to manage wellbore operations.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computing device, comprising:
a microprocessor; and
memory including instructions that, when executed by the microprocessor, cause the computing device to:
obtain impact data corresponding to energy transfer within a flow line from two or more sensors, the energy transfer associated with solid particles within a fluid in the flow line;
apply at least one filter to the impact data, the at least one filter discriminating noise within the impact data;
identify a signature in the impact data;
extract an envelope from at least a portion of the impact data, the envelope corresponding to a region of the impact data comprising the one signature;
determine a characteristic of the signature that meets a criteria; and
determine a property of at least one of the fluid or the solid particles, based at least in part on the characteristic of the signature.

2. The computing device of claim 1, wherein the memory includes instructions that, when executed by the microprocessor, further cause the computing device to:
obtain first impact data from a first sensor of the two or more sensors;
obtain second impact data from a second sensor of the two or more sensors; and
combine the first impact data and the second impact data to form the impact data, the combination comprising correlating the first impact data and the second impact data.

3. The computing device of claim 1, wherein the memory includes instructions that, when executed by the microprocessor, further cause the computing device to:
apply a second filter to the impact data, the second filter including one or more wavelet coefficients.

4. The computing device of claim 1, wherein the memory includes instructions that, when executed by the microprocessor, further cause the computing device to:
receive flow data from a fluid sensor in fluid communication with the flow line, the flow data comprising at least one of a temperature of the fluid, a volumetric flow rate of the fluid, a phase of the fluid, a volume fraction of the fluid, or a mass flow rate of the fluid.

5. The computing device of claim 1, wherein the memory includes instructions that, when executed by the microprocessor, further cause the computing device to:
determine an erosion rate, based at least in part on the property; and
transmit a signal to one or more flow control devices to regulate a flow of the fluid.

6. The computing device of claim 1, wherein the memory includes instructions that, when executed by the microprocessor, further cause the computing device to:
determine a size of one or more solid particles; and
generate a particle distribution map indicative of a range of sizes of the one or more solid particles.

7. The computing device of claim 1, wherein the characteristic is an amplitude of the signature.

8. A solids management system for determining a property of a flow within a flow line, the system comprising:
a solids detector arranged along a flow line, the flow line transporting a fluid having solid particles, the solids detector comprising:
a receptor extending at least partially into the flow line;
a first sensor coupled to a first end of the receptor; and
a second sensor coupled to the second end of the receptor; wherein the solid particles transmit energy to the receptor, upon impact, and the energy is measured by the first sensor and the second sensor;
a microprocessor; and
memory including instructions that, when executed by the microprocessor, cause the solids management system to:
obtain first impact data from the first sensor corresponding to the energy transmitted to the receptor by the solid particles;
obtain second impact data from the second sensor corresponding to the energy transmitted to the receptor by the solid particles;
apply a filter to the first impact data and to the second impact data, the at least one filter reducing noise within the first impact data and to the second impact data;
identify a signature in the first impact data and in the second impact data, the signature including a rising portion and a decaying portion, a characteristic of the signature being indicative of a quantity of energy transmitted to the receptor;
determine a characteristic of the identified signature meets a criteria; and
determine a property of at least one of the fluid or the solid particles, based at least in part on the characteristic of the identified signature.

9. The solids management system of claim 8, wherein the memory includes instructions that, when executed by the microprocessor, further cause the solids management system to:
multiply the first impact data and the second impact data together, the multiplication correlating corresponding signatures and reducing non-corresponding noise in the impact data.

10. The solids management system of claim 8, wherein the memory includes instructions that, when executed by the microprocessor, further cause the solids management system to:
determine an erosion rate, based at least in part on the property; and
transmit a signal to one or more flow control devices to regulate a flow of the fluid.

11. The solids management system of claim 8, wherein the memory includes instructions that, when executed by the microprocessor, further cause the computing device to:
apply a second filter to the first impact data and the second impact data, the second filter including one or more wavelet coefficients.

* * * * *